US012614773B2

(12) United States Patent
Gulliksson

(10) Patent No.: US 12,614,773 B2
(45) Date of Patent: Apr. 28, 2026

(54) FIRE SUPPRESSION SYSTEM

(71) Applicant: DAFO VEHICLE AB, Tyresö (SE)

(72) Inventor: Anders Gulliksson, Västerhaninge (SE)

(73) Assignee: DAFO VEHICLE AB, Tyresö (SE)

( * ) Notice: Subject to any disclaimer, the term of this patent is extended or adjusted under 35 U.S.C. 154(b) by 681 days.

(21) Appl. No.: 17/767,915

(22) PCT Filed: Sep. 17, 2020

(86) PCT No.: PCT/SE2020/050869
§ 371 (c)(1),
(2) Date: Apr. 10, 2022

(87) PCT Pub. No.: WO2021/071406
PCT Pub. Date: Apr. 15, 2021

(65) Prior Publication Data
US 2023/0081826 A1 Mar. 16, 2023

(30) Foreign Application Priority Data

Oct. 10, 2019 (SE) .................................... 1951153-4

(51) Int. Cl.
*H01M 10/613* (2014.01)
*A62C 3/16* (2006.01)
(Continued)

(52) U.S. Cl.
CPC ............. *H01M 10/613* (2015.04); *A62C 3/16* (2013.01); *A62C 37/40* (2013.01);
(Continued)

(58) Field of Classification Search
CPC ........ A62C 3/16; A62C 37/40; H01M 10/613; H01M 10/625; H01M 10/63;
(Continued)

(56) References Cited

U.S. PATENT DOCUMENTS 5,154,238 A * 10/1992 Buchan .................... A62C 3/07
169/48
6,561,281 B1 * 5/2003 Arnold ................... A62C 31/22
169/46
(Continued)

FOREIGN PATENT DOCUMENTS

CN 107469257 A 12/2017
CN 107768749 A 3/2018
(Continued)

OTHER PUBLICATIONS

English Translation of CN107768749 by Google Patents (Year: 2018).*

(Continued)

*Primary Examiner* — Chee-Chong Lee
(74) *Attorney, Agent, or Firm* — MARSHALL, GERSTEIN & BORUN LLP

(57) ABSTRACT

A fire suppression system including a gas detector device associated with an electrochemical unit and configured for detecting at least one gas character; a control unit coupled to the gas detector device and configured to, in a first comparison execution, compare said at least one gas character with at least one pre-set indicative gas character; wherein the control unit is configured to command an outlet device to discharge a fire extinguishing fluid over the electrochemical unit if the first comparison execution signifies that the detected gas character corresponds with the pre-set indicative gas character.

18 Claims, 5 Drawing Sheets

(51) Int. Cl.

| | |
|---|---|
| *A62C 37/40* | (2006.01) |
| *H01M 10/48* | (2006.01) |
| *H01M 10/625* | (2014.01) |
| *H01M 10/63* | (2014.01) |
| *H01M 10/6567* | (2014.01) |
| *B60L 3/00* | (2019.01) |
| *B60L 58/24* | (2019.01) |
| *B60R 16/033* | (2006.01) |

(52) U.S. Cl.
CPC ....... *H01M 10/482* (2013.01); *H01M 10/486* (2013.01); *H01M 10/625* (2015.04); *H01M 10/63* (2015.04); *H01M 10/6567* (2015.04); *B60L 3/0046* (2013.01); *B60L 58/24* (2019.02); *B60R 16/033* (2013.01); *H01M 2220/20* (2013.01)

(58) Field of Classification Search
CPC ........... H01M 10/6567; H01M 10/482; H01M 10/487; H01M 2220/20; B60L 58/24; B60L 3/0046; B60R 16/033
USPC .......................................................... 169/47
See application file for complete search history.

(56) References Cited

U.S. PATENT DOCUMENTS

| | | | |
|---|---|---|---|
| 2004/0182584 A1* | 9/2004 | Thompson | ............... A62C 3/04 169/46 |
| 2007/0221430 A1* | 9/2007 | Allison | .................. B60K 28/00 180/312 |
| 2009/0205846 A1 | 8/2009 | Zeweke et al. | |
| 2013/0264073 A1 | 10/2013 | Ling | |
| 2015/0017491 A1 | 1/2015 | Specht et al. | |
| 2017/0043194 A1 | 2/2017 | Ling | |
| 2017/0165513 A1 | 6/2017 | Li | |

FOREIGN PATENT DOCUMENTS

| | | |
|---|---|---|
| CN | 109499027 A | 3/2019 |
| CN | 109985335 A | 7/2019 |
| EP | 2 159 894 A1 | 3/2010 |
| EP | 2 755 275 A2 | 7/2014 |
| EP | 3 107 145 A1 | 12/2016 |
| JP | 2014036714 A | 2/2014 |
| WO | WO-2010/025761 A1 | 3/2010 |

OTHER PUBLICATIONS

International Search Report and Written Opinion for PCT/SE2020/050869, mailed Dec. 15, 2020.

Supplementary European Search Report, European Patent Application No. 20874301.3, dated Jun. 26, 2024.

Boris Grguric, "Development of an Automated HEV and EV Lithium Ion Battery Vehicle Fire Early Warning and Suppression System", Report D1.1 Design specification for given BUS topology, NOVAMINA Innovative Technology Center (2018).

Slaven Gaspar, "Development of an Automated HEV and EV Lithium Ion Battery Vehicle Fire Early Warning and Suppression System", Report D2.1 Smoke and Fire senors parameters for Li-ion batteries, NOVAMINA Innovative Technology Center (2018).

Boris Grguric, "Development of an Automated HEV and EV Lithium Ion Battery Vehicle Fire Early Warning and Suppression System", Report D2.2 Controller Parameters and Description, NOVAMINA Innovative Technology Center, (2018).

Davor Linaric, "Development of an Automated HEV and EV Lithium Ion Battery Vehicle Fire Early Warning and Suppression System", Report D3.1 Cooling & fire suppression tanks and distribution system against Volvo 7900 HE bus technology (2018).

Anders Gulliksson, "Development of an Automated HEV and EV Lithium Ion Battery Vehicle Fire Early Warning and Suppression System", Report D4.1 Li-IonFire Installation guidelines, DAFO Brand AB (2018).

Anders Gulliksson, "Development of an Automated HEV and EV Lithium Ion Battery Vehicle Fire Early Warning and Suppression System", Report D4.2 Li-IonFire system functionally tested and put in operation, DAFO Brand AB (2018).

Anders Gulliksson, "Development of an Automated HEV and EV Lithium Ion Battery Vehicle Fire Early Warning and Suppression System", Report D5.1 Actual performance specification, DAFO Brand AB (2018).

Johan Balstad, "Development of an Automated HEV and EV Lithium Ion Battery Vehicle Fire Early Warning and Suppression System", Report D6.1 Dissemination and exploitation plan, Dafo Vehicle Fire Protection AB (2018).

Johan Balstad, "Development of an Automated HEV and EV Lithium Ion Battery Vehicle Fire Early Warning and Suppression System", Report D6.2 Commericalization Plan, DAFO Brand AB (2018).

Johan Balstad, "Development of an Automated HEV and EV Lithium Ion Battery Vehicle Fire Early Warning and Suppression System", Report D6.3 Supply chain member list plan, Dafo Vehicle Fire Protection AB (2018).

Anders Gulliksson, "Development of an Automated HEV and EV Lithium Ion Battery Vehicle Fire Early Warning and Suppression System", Report D6.4 Training, technical support and system documentation, DAFO Brand AB (2018).

Anders Gulliksson, "Development of an Automated HEV and EV Lithium Ion Battery Vehicle Fire Early Warning and Suppression System", Report D6.5 Open access to scientific publications and related research data, DAFO Brand AB (2018).

Johan Balstad, "Development of an Automated HEV and EV Lithium Ion Battery Vehicle Fire Early Warning and Suppression System", Report D7.1 Communication strategy, DAFO Brand AB (2018).

"Development of an Automated HEV and EV Lithium Ion Battery Vehicle Fire Early Warning and Suppression System", Project Periodic Technical Report, Research for the benefit of specific groups (in particular SMEs) (2018).

Anders Gulliksson, "Development of an Automated HEV and EV Lithium Ion Battery Vehicle Fire Early Warning and Suppression System", Report D7.3 Project completion report, DAFO Brand AB (2018).

Notice of Opposition filed against corresponding Swedish Patent No. 1951153-4 on May 11, 2022, and Correspondence from Opponent summarizing Notice of Opposition against corresponding Swedish Patent No. 1951153-4, dated May 2, 2022.

\* cited by examiner

1

11'          22

1'

13

5

13          11          11          1'          11

15

29          3

17          12

RCS          24

CO

Temp.

FIRE SUPPRESSION SYSTEM

TECHNICAL FIELD

The present invention relates to a method of reducing heat output of an electrochemical unit by means of a fire suppression system and by means of the fire suppression system per se. The present invention also relates to a vehicle comprising the fire suppression system and a data medium product for performing the method.

One disclosure may relate to a method of reducing heat output of an automotive electrochemical unit, such as an automotive battery pack, by means of an automotive fire suppression system and by means of the automotive fire suppression system per se.

This disclosure also relates to a vehicle comprising the fire suppression system.

The present invention and/or disclosure may concern the industry manufacturing fire suppression systems and may concern the automotive industries producing vehicles configured for electrical propulsion. The present invention may further concern battery manufacturers for automotive and stationary applications.

BACKGROUND

Rechargeable high energy density batteries are used today for vehicles configured for electrical propulsion. The batteries may generate overheating, electrolyte overflow, fire, explosion or other failure. It is critical to provide sufficient time for evacuating the driver and/or passengers from the vehicle in case of battery fire and/or overheating battery.

Current fire suppression systems involve different ways to put out the fire. For example, there are some techniques having an alarm system making use of a temperature sensor mounted in vicinity of the battery for detection of an eventual fire. The temperature sensor in turn is coupled to an electrical circuit being adapted to activate a fire extinguishing fluid release arrangement for automatic extinguish the fire.

EP 3 107 145 shows a cooling system for thermal management. A fire-extinguishing package is configured to be opened when a temperature of the battery is higher than a pre-set temperature, wherein a fire-extinguishing agent is released into a space where the battery is located. By means of the thermal management shown in EP 3 107 145 there is achieved more escape time for passengers.

SUMMARY OF THE INVENTION

There is an object to provide fire suppression system configured for thermal management of an electrochemical unit in case of overheating of the electrochemical unit, which fire suppression system promotes for longer evacuating time for the driver and/or passengers to evacuate the vehicle in case the electrochemical unit is overheated and/or the electrochemical unit catches fire.

There is an object to provide a fire suppression system comprising an electrochemical unit, wherein the electrochemical unit is protected from damages eventually causing rapid overheating of the electrochemical unit in case of vehicle impact, at the same time as eventually overheating of the electrochemical unit is delayed, for providing longer escape time for evacuating the driver and/or passengers.

There is an object to a fire suppression system comprising an automotive electrochemical unit adapted for self-driving vehicles.

In vehicles without any driver it is extraordinary important that the passengers have time to leave the vehicle upon malfunction and eventually overheated electrochemical unit.

There is an object to provide fire suppression system, increasing reliability and redundancy.

There is an object to enhance the readiness to reduce heat output of the overheated automotive electrochemical unit of a vehicle.

According to one aspect, there is an object to provide a fire suppression system that cost-effectively provides detection of an overheated electrochemical unit and alerting the passengers and/or the driver to evacuate the vehicle.

According to one aspect, there is an object to provide a fire suppression system that cost-effectively provides automatic alerting fire departments, sending mass notification, providing gas and smoke detection notification, control of the fire, delay and extinguishing the fire and cooling the overheated electrochemical unit.

According to one aspect, there is an object to provide a redundancy and expeditious reduction of heat output of an electrochemical unit of a fire suppression system in a vehicle comprising an electrochemical unit monitoring apparatus or comprising an automotive computer system adapted for monitoring temperature status of the electrochemical unit.

This or at least one of said objects has been achieved by a method of reducing heat output of an electrochemical unit by means of a fire suppression system, which comprises a fire extinguishing fluid encompassed in fire extinguishing fluid container configured to be arranged adjacent to and/or remote and/or in contact with the electrochemical unit, and comprises an outlet device coupled to the fire extinguishing fluid container and configured to discharge the fire extinguishing fluid upon command, and comprises a gas detector device associated with the electrochemical unit and configured for detecting at least one gas character, and comprises a control unit coupled to the gas detector device and configured to, in a first comparison execution, compare said at least one gas character with at least one pre-set indicative gas character, wherein the control unit is configured to command the outlet device to discharge the fire extinguishing fluid on and/or into and/or fully around and/or partly around the electrochemical unit, if the first comparison execution signifies that the detected gas character corresponds with the pre-set indicative gas character.

The method comprises the steps of; arranging the fire extinguishing fluid container adjacent or in contact with the electrochemical unit; filling the fire extinguishing fluid container with the extinguishing fluid before or after said arranging step; detecting a gas leakage from the electrochemical unit; performing said first comparison execution; and commanding the outlet device to discharge the fire extinguishing fluid if the detected gas character corresponds with the pre-set indicative and set gas character.

Alternatively, the gas detector device is configured to detect at least one specific gas compound or substance or gas element, which is released from the electrochemical unit when eventually being heated or starts a process of heating, which heating may lead to a fire of the electrochemical unit.

In such way is achieved that a detection of heating or overheating of the electrochemical unit can be made when a starting process of heating the electrochemical unit eventually occurs before the heating progressive accelerates to be real heat and fire of the electrochemical unit.

Alternatively, the first comparison execution is configured to prevail over the second automotive comparison execution.

In such way the fire suppression system is configured to rapidly detect and efficiently delay the development of fire of the electrochemical unit.

Alternatively, the method comprises the further steps of; positioning the electrochemical unit in a protective housing; wherein the step of discharging the fire extinguishing fluid comprises discharge of the fire extinguishing fluid into the protective housing.

Alternatively, the control unit is configured to command the outlet device to continuously discharge the fire extinguishing fluid on and/or into and/or fully around and/or partly around the electrochemical unit.

Alternatively, the method comprises the further steps of; detecting a temperature change and/or temperature of the electrochemical unit by means of a temperature detector device of the fire suppression system; comparing, in a second comparison execution, the temperature change and/or temperature with a pre-set indicative temperature change and/or temperature; commanding the outlet device to discharge the fire extinguishing fluid if the detected temperature change and/or temperature corresponds with a pre-set indicative temperature change and/or temperature.

Alternatively, the outlet device comprises a valve unit coupled to the control unit.

Alternatively, the valve unit is positioned between the fire extinguishing fluid container and a fire extinguishing fluid outlet.

Alternatively, the fire extinguishing fluid outlet is positioned in the protective housing so that the fire extinguishing fluid promptly can be discharged into the interior of the protective housing in the event the control unit registers overheating of the electrochemical unit.

Alternatively, the method comprises the further steps of; detecting a temperature change and/or temperature of the electrochemical unit by means of a temperature detector device of the fire suppression system, commanding the outlet device to discharge the fire extinguishing fluid if the detected temperature change and/or temperature corresponds with a pre-determined and/or set and/or pre-set temperature change and/or temperature.

Alternatively, the electrochemical unit is fully enclosed in the protective housing, wherein the protective housing is configured to absorb energy by means of a shock absorption housing fully covering the electrochemical unit and/or configured to fully or at least entirely submerge the electrochemical unit in the fire extinguishing fluid in case of activation of the fire suppression system.

Alternatively, the shock absorption housing is configured to collect overflowing fire extinguishing fluid so that the fire extinguishing fluid covers and/or submerges the electrochemical unit in case of activation of the fire suppression system.

In such way is achieved a fire suppression system protecting the electrochemical unit from further defects in case of impact, which defects otherwise may result in overheating of the electrochemical unit (such as collision or other shock affecting the vehicle) at the same time as an rapid and effective cooling of the electrochemical unit is provided.

Alternatively, there is provided a gap between the electrochemical unit and the inner wall of the protective housing. The gap exhibits such measure that the fire extinguishing fluid in an effective way covers (fully or partially) the electrochemical unit and fully (or partially) continuously or intermittently fills the protective housing in case of fire or overheating of the electrochemical unit.

Alternatively, as a part or fragment of the fire extinguishing fluid evaporates when meeting the heated interior of the protective housing, the discharge of the fire extinguishing fluid is made continuous from the fire extinguishing fluid container for providing that the protective housing continuously is filled with fire extinguishing fluid during the discharge of fire extinguishing fluid.

Alternatively, the method comprises the steps of; performing said first comparison execution; and performing said second comparison execution.

Alternatively, the control unit is configured to, in the second comparison execution, compare the real time temperature change and/or temperature of the electrochemical unit with a pre-determined temperature change and/or temperature set in a programme code readable on the control unit and stored on a data medium, wherein the control unit is configured to command the outlet device to discharge the fire extinguishing fluid on or into or fully around or partly around the electrochemical unit, if the second comparison execution signifies that the detected temperature change and/or temperature corresponds with the pre-set indicative temperature change and/or temperature.

Alternatively, the temperature detector device is configured to detect temperature change of the electrochemical unit and/or configured to detect the real time temperature of the electrochemical unit.

Alternatively, the fire suppression system comprises at least one electrochemical unit.

Alternatively, the step of performing said first comparison execution precedes the step of performing said second comparison execution.

Alternatively, the step of performing said second comparison execution precedes the step of performing said first comparison execution.

Alternatively, the step of performing said first comparison execution is made simultaneously with the step of performing said second comparison execution.

The control unit is coupled wireless or via wire to the gas detector device and/or coupled wireless or via wire to the temperature detector device.

The control unit is configured to monitor any and/or a specific gas character change in the environment at least partially or fully around the electrochemical unit in a first monitoring sequence and/or is configured to monitor any and/or a specific real time temperature change and/or temperature of the electrochemical unit in a second monitoring sequence.

The temperature change and/or temperature is monitored interior and/or exterior and/or adjacent and/or on the surface of the electrochemical unit Alternatively, the temperature detector device is arranged adjacent the exterior of the electrochemical unit and/or onto the electrochemical unit and/or within the interior of the electrochemical unit.

The control unit is configured to intermittently or continuously perform the first and/or second monitoring sequence.

The control unit is configured to intermittently or continuously perform said first comparison execution and/or said second comparison execution.

The outlet device coupled to the fire extinguishing fluid container is configured to deliver a cooling rate of 25-75 degrees Celsius per minute, preferably 40-60 degrees Celsius per minute, where the convective hear transfer coefficient is more than 1500-2500 $W/(m^2)$.

In such way is provided a fire suppression system that effective reduces the heat output of an eventually overheated electrochemical unit in a fast and effective manner for providing a longer evacuation time for passengers.

In such way is achieved that an eventual fire from an electrochemical unit can be delayed or reduced initially during the most critical moment needed for evacuating passengers and/or the driver from a vehicle.

Alternatively, the fire suppression system functions automatically or semi-automatically.

Alternatively, the method comprises the steps of; coupling the control unit to a communication protocol of an automotive computer system; and comparing in a back-up automotive comparison execution, a real time temperature change and/or temperature of the electrochemical unit detected by the automotive computer system with a pre-set indicative temperature change and/or temperature pre-set in a program of the control unit.

Alternatively, the control unit is associated with the automotive computer system of a vehicle via a communication protocol, and is configured to compare, in a back-up automotive comparison execution, a real time temperature change and/or temperature of the electrochemical unit detected by the automotive computer system, with a pre-set indicative temperature change and/or temperature pre-set in the control unit.

Alternatively, the automotive computer system comprises temperature sensor, a central processing unit configured for processing data regarding data with detected temperatures, a memory unit configured for storing a data program and configured for storing data to be processed and an input/output unit configured for communicating with a user, such as a driver, which data is compatible with data of the control unit.

Alternatively, the control unit is configured to process data, which is integrated with data from the automotive computer system.

Alternatively, the automotive computer system comprises temperature sensor, a central processing unit configured for processing data regarding pre-set temperature data with detected temperatures, a memory unit configured for storing a program and configured for storing the data to be processed and an input/output unit configured for communicating with a user via a user interface presenting on the user interface (e.g. a display) information of an overheated electrochemical unit and/or alarming the passengers and/or the driver in case of evacuating the vehicle and/or automatic alerting fire departments and/or sending mass notification and/or displaying gas and heat detection notification.

Alternatively, the automotive computer system is coupled to a transponder and/or voyage data recorder for recording relevant data of temperature changes of the electrochemical unit in different geographical positions of the vehicle.

Alternatively, the communication protocol may be a standardized communication protocol and may be adapted to the automotive computer system.

Alternatively, the control unit is adapted to be releasable coupled to the communication protocol.

Alternatively, at least two fire suppression system, each of which comprising a respective control unit, are coupled to the communication protocol of the automotive computer system.

Alternatively, the communication protocol utilized by the control unit and the automotive computer system uses a program language common for the control unit and the automotive computer system.

Alternatively, the control unit and the automotive computer system being compatible with each other.

Alternatively, the communication protocol is an open protocol.

In such way is achieved that detectors, interfaces and control equipment are interchangeable across a wide range of fire suppression component providers.

Alternatively, the communication protocol is a closed protocol.

Alternatively, the respective fire suppression system is coupled to the automotive computer system via the respective control unit of the respective fire suppression system.

Alternatively, a respective fire suppression system of the vehicle is coupled to the central processing unit of the automotive computer system via a common control unit of the fire suppression system.

Alternatively, at least one condition being pre-set in a program of the control unit, which program is configured for controlling the fire suppression system, which pre-set condition is based on at least one parameter determined by the automotive computer system associated with or coupled to the control unit. The parameter may be determined e.g. by a real time temperature change and/or temperature of the electrochemical unit detected by the automotive computer system.

This or at least one of said objects has been achieved by a fire suppression system configured to reduce heat output of an electrochemical unit by means of a fire extinguishing fluid encompassed in a fire extinguishing fluid container arranged adjacent to and/or in contact with the electrochemical unit; the fire suppression system comprises; an outlet device coupled to the fire extinguishing fluid container and configured to discharge the fire extinguishing fluid upon command; a gas detector device associated with the electrochemical unit and configured for detecting at least one gas character; a control unit coupled to the gas detector device and configured to, in a first comparison execution, compare said at least one gas character with at least one pre-set indicative gas character; and the control unit is further configured to command the outlet device to discharge the fire extinguishing fluid on and/or into and/or fully around and/or partly around the electrochemical unit, if the first comparison execution signifies that the detected gas character corresponds with the pre-set indicative gas character.

Alternatively, the electrochemical unit is arranged in a protective housing and the outlet device is configured to discharge the fire extinguishing fluid into the protective housing.

Alternatively, the electrochemical unit comprises at least one battery cell.

Alternatively, the battery cell is a rechargeable high energy density lithium-ion battery and/or lithium iron phosphate (LFP) and/or nickel manganese (NMC) and/or lithium cobalt oxide and/or other lithium metal oxides (LTOs), etc.) and/or lithium polymer and/or nickel metal hydride and/or nickel cadmium and/or nickel hydrogen and/or nickel zinc and/or silver zinc or other types of electrochemical units.

Alternatively, the electrochemical units, e.g. lithium-ion batteries, when entering a possible state of failure, undergoes an internal exothermic process driven by the chemical composition within the battery cell of the electrochemical unit. The process also generates an overpressure within the battery cell. To prevent explosions of the battery cell, the battery cells and/or the electrochemical unit may comprise venting means to vent this overpressure at a defined pressure detected by a battery cell pressure detector device associated with the battery cell.

Alternatively, the control unit operates the venting means to vent this detected overpressure, if the detection goes beyond the defined pressure registered by the control unit.

The detected overpressure does not mean that the battery cell has entered a thermal runaway point and undergoes overheating, but it is a definite indication that a process to eventually reach the thermal runaway point has started.

The composition of the emitted gases from the venting means varies slightly between different battery chemistries but there are some common factors. The emitted gases may consist of a mixture of Hydrocarbons like CH4 (methane), C2H4 (ethylene), C2H6 (ethane) as well as H2 (hydrogen), CO2 (carbon dioxide), and CO (carbon monoxide).

As gas sensors for hydrogen as well as ethylene and ethane are quite expensive and normally have a limited life span, and CO2 could be used as an extinguishing fluid, e.g. an active cooling agent, the present invention makes use of detection of the carbon monoxide and/or methane.

Alternatively, the gas detector device is configured to detect carbon monoxide and/or methane emitted from the electrochemical unit.

Alternatively, the gas detector device in cooperation with the battery cell pressure detector device are configured to detect carbon monoxide and/or methane emitted from the electrochemical unit by means of the control unit.

Alternatively, the control unit is coupled to the gas detector device and is configured to, in a first comparison execution, compare said detected carbon monoxide and/or methane with at least one pre-set indicative carbon monoxide and/or methane gas character.

The carbon monoxide is dominant over methane, which implies fast response promoting an early warning functionality of the fire suppression system.

Alternatively, the control unit is coupled to the gas detector device and/or to the battery cell pressure detector device, wherein the control unit is configured to, in a first comparison execution, compare said detected carbon monoxide gas character with at least one pre-set indicative carbon monoxide gas character.

The point when the emission of measurable CO increases occurs earlier than when temperature of the battery cell increases.

By this early detection of CO emission (e.g. at the time for said venting by means of the venting means) from the electrochemical unit, there is achieved an active fire suppression system preventing heat build-up in the battery cells of the electrochemical unit.

Alternatively, the control unit is coupled to a battery management system (BMS) configured to disconnect the battery from a charging source and/or a power consuming device.

Alternatively, the control unit is coupled to the gas detector device and/or to the battery cell pressure detector device, wherein the control unit is configured to, in a first comparison execution, compare said detected carbon monoxide and/or methane gas characters/character with at least one pre-set indicative carbon monoxide and/or methane gas characters/character.

Alternatively, the control unit is configured to switch off the electrochemical unit by means of the battery management system (BMS), if the detected carbon monoxide and/or methane gas characters/character exceed/exceeds and/or reach/reaches and/or correspond/corresponds with the pre-set indicative carbon monoxide and/or methane gas characters/character.

Alternatively, the at least one pre-set indicative carbon monoxide and/or methane gas characters/character is set (pre-programmed) in the program code of the control unit.

Alternatively, the control unit is configured to command discharge of the fire extinguishing fluid on and/or into and/or fully around and/or partly around the electrochemical unit, if the detected carbon monoxide and/or methane gas characters/character exceed/exceeds and/or reach/reaches and/or correspond/corresponds with the pre-set indicative carbon monoxide and/or methane gas characters/character.

By this early detection of CO emission and/methane gas emission (e.g. at the time for said venting by means of the venting means) from the electrochemical unit, there is achieved an active fire suppression system preventing heat build-up in the battery cells of the electrochemical unit, wherein the control unit of the fire suppression system switches off the electrochemical unit and/or commands the outlet device to discharge the fire extinguishing fluid on and/or into and/or fully around and/or partly around the electrochemical unit, i.e. the control unit may be configured to both switch off and discharge the fire extinguishing fluid by this early detection, for reducing the heat output of an electrochemical unit.

In such a way is achieved a fire suppression system that is configured to discharge the fire extinguishing fluid on and/or into and/or fully around and/or partly around the electrochemical unit, if the first comparison execution signifies that the detected gas character corresponds with the pre-set indicative gas character.

The efficiency of the fire suppression system depends upon how early the fire extinguishing fluid is discharged.

The term control unit may be replaced by the term control circuitry, alternatively comprising a central processing unit.

Alternatively, at least one battery cell may be arranged in a battery module and may be interconnected with another battery cell to achieve higher voltage.

Alternatively, the electrochemical unit comprises a plurality of battery cells constituting a battery module.

Alternatively, at least two battery modules constitute a battery pack.

The electrochemical unit may be called "battery" or "electric vehicle battery" or "plurality of battery cells" or "battery module" etc.

Alternatively, the discharge of the fire extinguishing fluid on and/or into and/or fully around and/or partly around the electrochemical unit is performed with continuous flow or intermittent flow by means of the outlet device.

Alternatively, the outlet device comprises a valve unit, such as a pulse width modulated (PWM) valve, coupled to and controlled by the control unit.

Alternatively, the outlet device comprises a rippable membrane, which is configured to be ripped up by means of e.g. increasing the pressure in the fire extinguishing fluid container by means of a pressurizing apparatus controlled by the control unit.

Alternatively, the valve unit is coupled between the fire extinguishing fluid container and at least one nozzle device associated with, and configured for fluid communication with the electrochemical unit.

Alternatively, the nozzle device comprises at least one nozzle configured to discharge the fire extinguishing fluid on and/or into and/or fully around and/or partly around the electrochemical unit and/or into the protective housing.

Alternatively, the fire suppression system further comprises a temperature detector device coupled to the control unit and configured for detecting a temperature change and/or temperature of the electrochemical unit.

Alternatively, the automotive computer system and the fire suppression system are compatible with each other and being arranged in a vehicle comprising an electrochemical unit configured for electric propulsion of the vehicle.

Alternatively, the automotive computer system is configured to handle different temperatures of different electrochemical units in a battery pack of a vehicle and is configured to identify at least one temperature change and/or temperature (of at least one electrochemical unit) deviating from at least one pre-set indicative temperature change and/or temperature of that electrochemical unit depending on the driving mode of the vehicle.

This or at least one of said objects has been achieved by a vehicle comprising a fire suppression system according to any of the claims, wherein the control unit is configured to manage the method steps according to any of the method claims.

This or at least one of said objects has been achieved by a data medium, configured for storing a program, configured for controlling the fire suppression system of said vehicle, wherein said data medium comprises a program code stored on the data medium, which program code is readable on the control unit for performing the method steps according to the claims.

This or at least one of said objects has been achieved by a data medium product comprising a program code stored on a data medium, which program code is readable on the control unit for performing the method steps disclosed herein, when said data medium is run on the control unit.

Alternatively, the control unit, making use of the data medium, controls the fire suppression system from detected gas character and temperature change.

Alternatively, the data medium comprises a program code being readable on the control unit, being programmed for performing the method herein disclosed for reducing eventual exceeding heat output of the electrochemical unit.

Alternatively, the control code is programmed and beforehand set with the indicative gas character, which indicative gas character is determined from earlier try-outs in laboratory and experience analysing gas leakage from the electrochemical unit before the electrochemical unit catches fire, wherein the content and concentration of the gas leaking electrochemical unit reveals a specific gas character, or at least one gas character, indicative that the electrochemical unit is overheated.

This or at least one of said objects has been achieved by a method of reducing heat output of an automotive electrochemical unit by means of an primary fire suppression system of a vehicle, which primary fire suppression system comprises; a fire extinguishing fluid encompassed in a fire extinguishing fluid container configured to be arranged remote and/or adjacent to and/or in contact with the automotive electrochemical unit; and at least one fire extinguishing fluid outlet coupled to the fire extinguishing fluid container and configured to discharge the fire extinguishing fluid over the automotive electrochemical unit upon command from an automotive computer system of the primary fire suppression system and/or from a control unit of a secondary fire suppression system.

The method comprises the steps of; arranging the fire extinguishing fluid container in the vehicle; filling the fire extinguishing fluid container with the extinguishing fluid before or after said arranging step; coupling the automotive computer system of the primary fire suppression system to the control unit of the secondary fire suppression system via a communication protocol; comparing in an automotive comparison execution, a real time temperature change and/or temperature of the automotive electrochemical unit detected by the primary fire suppression system, with an indicative temperature change and/or indicative temperature of the automotive electrochemical unit; and comparing in a first comparison execution, at least one gas character, generated by the automotive electrochemical unit and detected by the secondary fire suppression system, with at least one indicative gas character pre-set in the control unit of the secondary fire suppression system; and commanding discharge of the fire extinguishing fluid, if either of the automotive comparison execution or the first comparison execution or both comparison executions implies that an indicative limit is exceeded.

Alternatively, the method comprises the further steps of; signalling the real time temperature change and/or temperature of the automotive electrochemical unit detected by the automotive computer system of the primary fire suppression system to the control unit of the secondary fire suppression system; wherein the control unit commands discharge the fire extinguishing fluid.

This or at least one of said objects has been achieved by a primary fire suppression system of a vehicle configured to reduce heat output of an automotive electrochemical unit, which primary fire suppression system comprises; a fire extinguishing fluid encompassed in a fire extinguishing fluid container configured to be arranged remote and/or adjacent to and/or in contact with the automotive electrochemical unit; at least one fire extinguishing fluid outlet coupled to the fire extinguishing fluid container and configured to discharge the fire extinguishing fluid over the automotive electrochemical unit upon command from an automotive computer system of the primary fire suppression system and/or from a control unit of a secondary fire suppression system.

Alternatively, the secondary fire suppression system corresponds with the fire suppression system disclosed herein.

Alternatively, the protective housing is configured to be entirely filled with the fire extinguishing liquid by overflowing the protective housing with the fire extinguishing liquid, thereby achieving optimal cooling of the overheated electrochemical unit.

This or at least one of said objects has been achieved by that the automotive computer system is configured to manage the method steps according to any of claims 14 to 15.

This or at least one of said objects has been achieved by a data medium, configured for storing a program, configured for controlling the primary fire suppression system of the vehicle according to claim 17, wherein said data medium comprises a program code stored on the data medium, which program code is readable by the automotive computer system for performing the method steps according to any of claims 14 to 15.

This or at least one of said objects has been achieved a data medium product comprising a program code stored on a data medium, which program code is readable by the automotive computer system for performing the method steps according to any of claims 14 to 15, when the data medium according to claim 18 is run by the automotive computer system.

Alternatively, the automotive computer system and control unit being configured to command discharge of the fire extinguishing fluid on and/or into and/or fully around and/or partly around the automotive electrochemical unit, in case the automotive electrochemical unit is overheated.

Alternatively, the at least one gas character can be detected by a gas detector device of the secondary fire suppression system, which gas detector device being associated with and/or positioned adjacent the electrochemical unit and configured for detecting at least one gas character.

Alternatively, according to one aspect, the automotive computer system is configured to be coupled to the control unit of the secondary fire suppression system (the fire suppression system) comprising the gas detector.

Alternatively, according to one aspect, the automotive computer system is configured to be coupled to the control unit via a serial bus configured for electrical interface explicitly providing electrical compatibility and related data transfer, which data regards real time temperature change and/or temperature of the automotive electrochemical unit detected by a temperature sensor of the primary fire suppression system and which data regards the at least one gas character, eventually generated by the automotive electrochemical unit and detected by the secondary fire suppression system.

Alternatively, a temperature sensor of the primary fire suppression system being coupled to the automotive computer system for detecting a temperature change and/or temperature of the automotive electrochemical unit.

Alternatively, the secondary fire suppression system is a complementary system to the primary fire suppression system.

Alternatively, the secondary fire suppression system is configured to take into account the detection of a temperature change and/or temperature of the automotive electrochemical unit made by the primary fire suppression system, wherein the control unit is configured to command discharge of the fire extinguishing fluid on and/or into and/or fully around and/or partly around the automotive electrochemical unit, in case the automotive electrochemical unit is overheated.

Alternatively, the secondary fire suppression system is configured to take into account the detection of the at least one gas character, detected by the secondary fire suppression system, wherein the control unit is configured to command discharge of the fire extinguishing fluid on and/or into and/or fully around and/or partly around the automotive electrochemical unit, in case the automotive electrochemical unit is overheated.

Alternatively, the primary fire suppression system is configured to take into account the detection of a temperature change and/or temperature detected by the secondary fire suppression system, wherein the automotive computer system is configured to command discharge of the fire extinguishing fluid on and/or into and/or fully around and/or partly around the automotive electrochemical unit, in case the automotive electrochemical unit is overheated.

Alternatively, the primary fire suppression system is configured to take into account the detection of the at least one gas character, detected by the secondary fire suppression system, wherein the automotive computer system is configured to command discharge of the fire extinguishing fluid on and/or into and/or fully around and/or partly around the automotive electrochemical unit, in case the automotive electrochemical unit is overheated.

Alternatively, the first comparison execution is configured to prevail over the automotive comparison execution.

The definition of the indicative limit may involve a first value of the detected gas character content and/or concentration of the gas leaking electrochemical unit, which first value is set to be indicative for starting discharge of the fire extinguishing fluid.

The definition of the indicative limit may involve a second value of the detected temperature of the automotive electrochemical unit, which second value is set to be indicative for starting discharge of the fire extinguishing fluid.

Alternatively, according to one aspect, the control unit is configured to command the outlet device to discharge the fire extinguishing fluid over the electrochemical unit when the pre-set indicative gas character corresponds with or is overrun by a specific concentration level of the detected gas character.

In such way the automotive fire suppression system of the vehicle can make use of the fire suppression system, herein described, making use of also gas detection, and enhance the readiness to reduce heat output of the overheated automotive electrochemical unit.

Alternatively, according to one aspect, the method comprises signalling the real time temperature change and/or temperature of the automotive electrochemical unit, detected by the automotive computer system to the control unit; wherein the control unit commands the fire extinguishing fluid outlet to discharge the fire extinguishing fluid.

This or at least one of said objects has been achieved by a primary fire suppression system of a vehicle configured to reduce heat output of an automotive electrochemical unit, which primary fire suppression system comprises; a fire extinguishing fluid encompassed in a fire extinguishing fluid container configured to be arranged remote and/or adjacent to and/or in contact with the automotive electrochemical unit; at least one fire extinguishing fluid outlet coupled to the fire extinguishing fluid container and configured to discharge the fire extinguishing fluid over the automotive electrochemical unit upon command from an automotive computer system of the primary fire suppression system and/or from a control unit of a secondary fire suppression system.

Alternatively, the fire extinguishing fluid outlet is coupled to the fire extinguishing fluid container and configured to discharge the fire extinguishing fluid upon command. The automotive computer system is configured to command the fire extinguishing fluid outlet to discharge the fire extinguishing fluid on and/or into and/or fully around and/or partly around the automotive electrochemical unit, in case the automotive electrochemical unit is overheated.

Alternatively, according to one aspect, the automotive fire suppression system is configured to manage the method steps herein disclosed.

This or at least one of said objects has been achieved by a data medium, configured for storing a program, configured for controlling the automotive fire suppression system of the vehicle, wherein said data medium comprises a program code stored on the data medium, which program code is readable by the automotive computer system for performing the method steps herein disclosed.

This or at least one of said objects has been achieved by a data medium product comprising a program code stored on a data medium, which program code is readable by the automotive computer system for performing the method steps, when the data medium is run by the automotive computer system.

Alternatively, if the at least one control unit of the automotive fire suppression system notifies that the temperature (automotive fire suppression system) of the electrochemical unit rises above a pre-set temperature, the at least one control unit commands the fire extinguishing fluid outlet device to open and apply the fire extinguishing fluid over and or around fully covering the overheated electrochemical unit.

Alternatively, the primary fire suppression system comprises, and/or is coupled to, at least one secondary fire suppression systems, which is coupled to an automotive computer system of the vehicle.

The primary fire suppression system may be called automotive fire suppression system.

Alternatively, the vehicle is a bus, a car, a lorry, a truck, a motor cycle, a self-driving vehicle, an aerial vehicle or other.

The present invention is not limited to automotive applications, but also stationary applications may be possible.

BRIEF DESCRIPTION OF THE DRAWINGS

The present invention will now be described by way of examples with references to the accompanying schematic drawings, of which.

DETAILED DESCRIPTION

Hereinafter, examples of the present invention will be described in detail with reference to the accompanying drawings, wherein for the sake of clarity and understanding of the invention some details of no importance may be deleted from the drawings.

Figure 1:
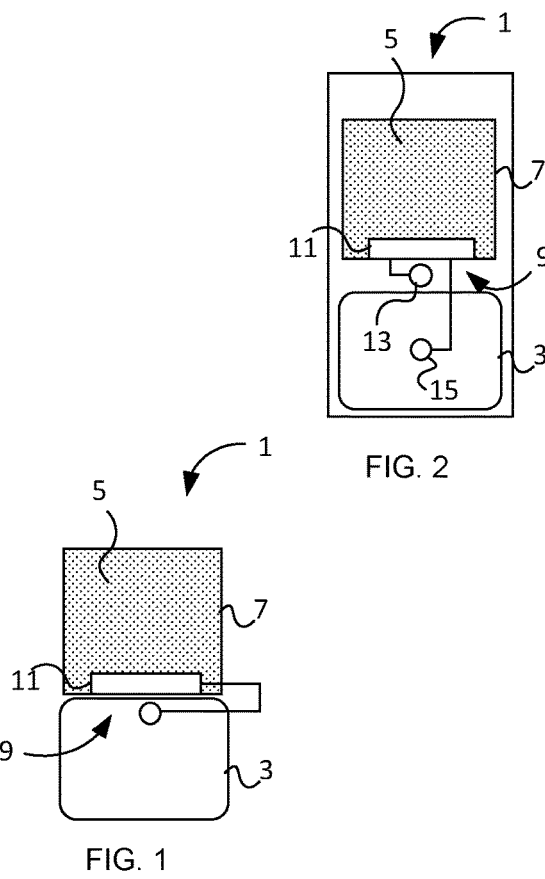
FIG. 1 illustrates a fire suppression system according to a first example.

FIG. 1 illustrates a fire suppression system 1 according to a first example. The fire suppression system 1 is configured to reduce heat output of a single electric battery cell 3 by means of a fire extinguishing fluid 5. The fire extinguishing fluid 5 is stored in a container 7 arranged adjacent the electric battery cell 3.

The fire suppression system 1 comprises an outlet 9 comprising a membrane (not shown) closed by a membrane removal actuator (not shown). The outlet 9 is configured for fluid communication with the container 7 and configured to discharge the fire extinguishing fluid 5 upon command from a control unit 11 coupled to the membrane removal actuator. The fire suppression system 1 comprises a gas detector 13 positioned at the electric battery cell 3.

The gas detector 13 is configured for detecting at least one gas character of a gas that eventually leaks from the electric battery cell 3.

The detected gas character can be recognized by the control unit 11 coupled to the gas detector 13, wherein the control unit 11, in a first comparison execution, compares the gas character with a pre-set indicative gas character.

The pre-set indicative gas character is programmed as data setup in a program code of the control unit 11.

The program code is programmed and setup with the indicative gas character, which indicative gas character may be determined from earlier try-outs in laboratory and experience analysing any gas character leaking from the electric battery cell 3 before the electric battery cell 3 eventually catches fire.

The control unit 11 uses a specific data medium and/or a common a data medium configured for controlling the fire suppression system 1.

The data medium comprises the program code being readable on the control unit 11 for performing the method of reducing eventual exceeding heat output of the electric battery cell 3.

The control unit 11 is configured to command the membrane removal actuator of the outlet 9 to discharge the fire extinguishing fluid 5 on and/or into and/or fully around and/or partly around the electric battery cell 3 if the first comparison execution signifies that the detected gas character corresponds with the pre-set indicative gas character.

Figure 2:
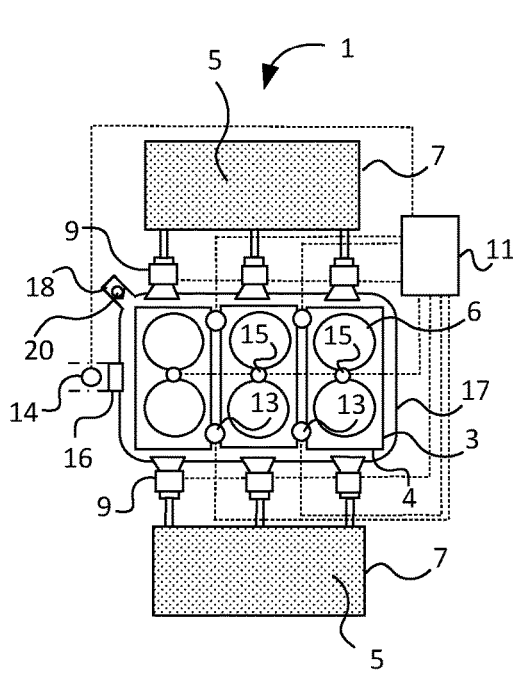
FIG. 2 illustrates a fire suppression system according to a second example.

FIG. 2 illustrates a fire suppression system 1 according to a second example.

The fire suppression system 1 is configured to reduce heat output of an electric battery 3 by means of a fire extinguishing fluid 5. The fire extinguishing fluid 5 is stored in a container 7 arranged adjacent with the electric battery 3. The fire suppression system 1 comprises an outlet 9 having a valve (not shown) and an electromagnetic actuator (not shown). The outlet 9 is configured for fluid communication with the container 7 and configured to discharge the fire extinguishing fluid 5 upon command from a control unit 11 coupled to the membrane removal actuator. The fire suppression system 1 comprises a gas detector 13 positioned above and adjacent the electric battery 3.

The gas detector 13 is configured for detecting at least one gas character of a gas that eventually leaks from the electric battery 3. The detected gas character can be recognized by the control unit 11 coupled to the gas detector 13, wherein the control unit 11, in a first comparison execution, compares the gas character with a pre-set indicative gas character. The pre-set indicative gas character is programmed as data setup in a program code of the control unit 11.

The program code is programmed and setup with the indicative gas character, which indicative gas character may be determined from earlier try-outs in laboratory and experience analysing any gas character leaking from the electric battery before the electric battery 3 eventually catches fire.

The fire suppression system 1 further comprises a temperature detector 15 positioned interior the electric battery 3 and being coupled to the control unit 11, configured for detecting a temperature change and/or temperature of the electric battery 3.

The control unit 11 is configured to support the gas detection with the temperature detection, which is made by the control unit 11 performing a first comparison execution regarding the gas detection and performing a second comparison execution regarding the temperature detection.

Alternatively, according to one aspect, the control unit 11 may be configured to be associated with an automotive computer system (not shown) of a vehicle (not shown) via a communication protocol, and may be configured to compare, in a back-up automotive comparison execution, a real time temperature change and/or temperature of the electrochemical unit detected by the automotive computer system, with a pre-set indicative temperature change and/or temperature pre-set in the control unit.

Figure 3:
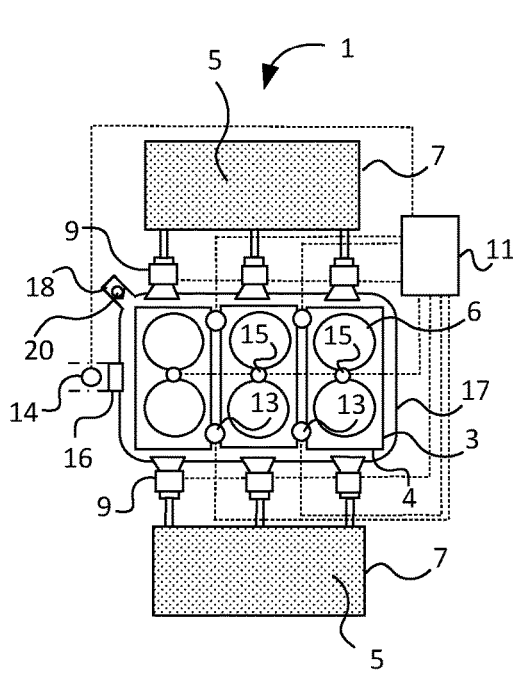
FIG. 3 illustrates a fire suppression system according to a third example.

FIG. 3 illustrates a fire suppression system 1 according to a third example. The fire suppression system 1 is configured to reduce heat output of a battery pack 3 comprising three battery modules 4, each having two battery cells 6.

The battery pack 3 is positioned in a protective housing 17.

The fire suppression system 1 comprises two fire extinguishing liquid containers 7 each coupled to three fire extinguishing liquid outlets 9, each with a discharge positioned interior the protective housing 17.

Each fire extinguishing liquid outlets 9 is coupled to the control unit 11 for signalling an electrical command to open the respective fire extinguishing liquid outlet 19 in case of overheating and/or gas leakage detection.

The fire suppression system 1 comprises four gas detectors 13 positioned adjacent the battery cells 6. Each gas detector 13 is configured for detecting at least one gas character of a gas that eventually leaks from the battery pack 3 due to overheating of at least one of the battery cells 6.

The fire suppression system 1 comprises three temperature detectors 15 positioned onto and/or adjacent and/or adjacent the battery cells 6.

The gas detectors 13 and temperature detectors 15 are coupled to the control unit 11.

The detected gas character is recognized by the control unit 11, and compared by the control unit with a pre-set gas character significant for a gas eventually leaking from a battery cell 6.

The detected temperature is recognized by the control unit 11 and is compared by the control unit 11 with a pre-set temperature significant for any temperature rise of any battery cell 6.

Alternatively, a complementary gas detector 14 is positioned in and/or adjacent an over-pressure valve 16 being arranged in the protective housing 17, wherein the pressure valve 16 is configured for regulating an eventual over pressure due to gas production of any overheated battery cell 6.

Alternatively, an outlet channel 18 is arranged through the protective housing 17 for proving an outlet for the fire extinguishing liquid 5 during discharge of the fire extinguishing liquid 5 filling up the protective housing 17.

In such way there is achieved that the protective housing 17 would be entirely filled with the fire extinguishing liquid 5 by overflowing the protective housing 17 with the fire extinguishing liquid 5, thereby achieving optimal cooling of the overheated battery cell 6 and/or battery cells 6.

Alternatively, a non-return valve 20 is arranged in the outlet channel 18.

Figure 4A:
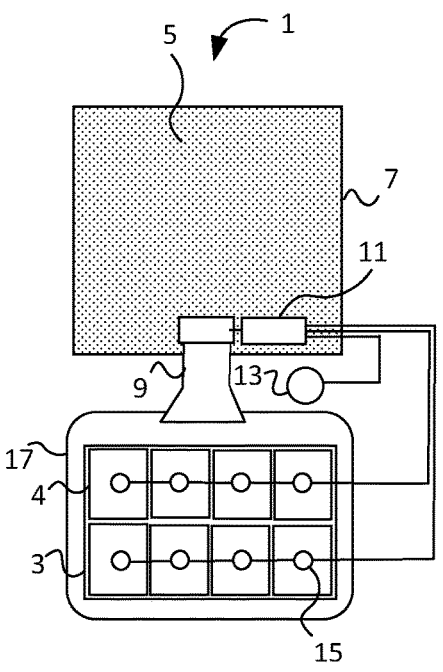
FIGS. 4*a* and 4*b* illustrate a fire suppression system according to a fourth example.
Figure 4B:
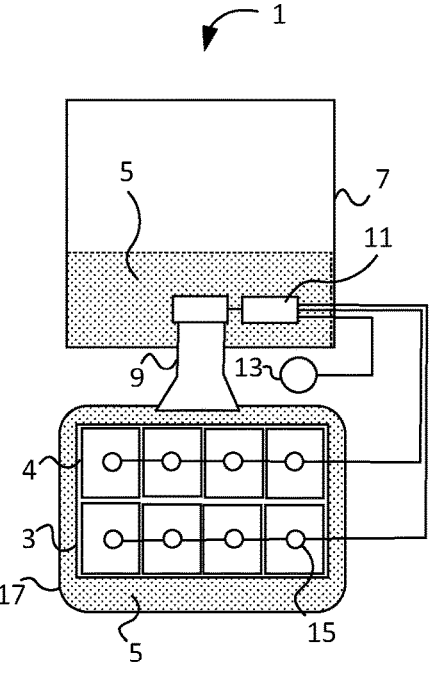

FIGS. 4a and 4b illustrate a fire suppression system 1 according to a fourth example. The fire suppression system 1 in FIG. 4a is configured to reduce heat output of a battery pack 3 comprising eight battery modules 4, each having a plurality of battery cells (not shown). The fire suppression system 1 comprises one gas detector 13 and eight temperature detectors 15 positioned adjacent the battery cells. The gas detector 13 and temperature detectors 15 are coupled to a control unit 11. Any detected gas character is recognized by the control unit 11 and being compared by the control unit with a pre-set gas character significant for any gas leaking from the battery cell in case of overheating. FIG. 4b shows activation of the fire suppression system 1 after detection of a significant gas character bringing about the filling of fire extinguishing liquid 5 into the protective housing 17.

Figures 5, 16:
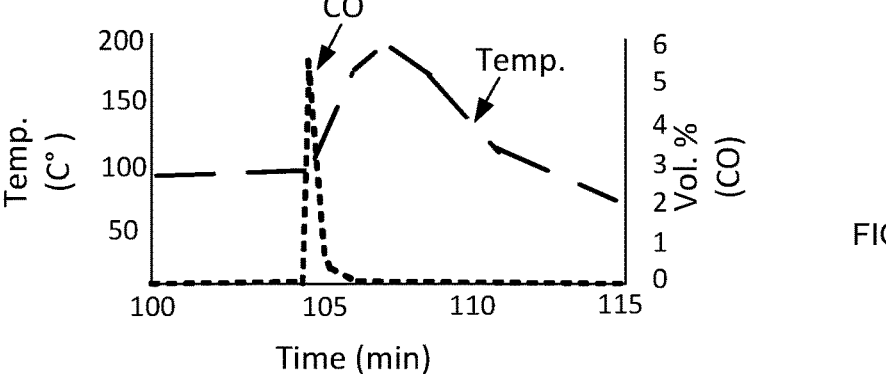
FIG. 5 illustrates a fire suppression system according to a fifth example.
FIG. 16 illustrates a diagram emphasising detection of CO (carbon monoxide) by means of the gas detector device, wherein the detection of increased vol. % (CO) in time precedes the moment when temperature increases and overheating is a fact.

FIG. 5 illustrates a fire suppression arrangement 1 according to a fifth example.

The fire suppression arrangement 1 is configured to reduce heat output of at least one electrochemical unit 3 by means of a fire extinguishing fluid 5 encompassed in fire extinguishing fluid containers 7 arranged adjacent to and/or in contact with the respective electrochemical unit 3. The fire suppression arrangement 1 comprises at least two fire suppression systems 1', each comprising a respective control unit 11 coupled to a respective set of gas detectors 13 and alternatively coupled to a set of temperature detectors 15. Each control unit 11 is coupled to a central control circuitry 11' of the fire suppression arrangement 1.

A respective outlet 9 is coupled to each fire extinguishing fluid container 7 and being configured to discharge the fire extinguishing fluid 5 upon command from the central control circuitry 11' in response to any of the fire suppression systems 1' to be activated.

The respective control unit 11 is coupled to the respective gas detector 13 and being configured to, in a first comparison execution, compare said at least one gas character with at least one pre-set indicative gas character. The respective control unit 11 is further configured to command the outlet 9 to discharge the fire extinguishing fluid 5 on and/or into and/or fully around and/or partly around the associated electrochemical unit 3, if the first comparison execution signifies that the detected gas character corresponds with the pre-set indicative gas character.

Each electrochemical unit 3 is arranged in a respective protective housing 17 and the outlet 9 is configured to discharge the fire extinguishing fluid 5 into the protective housing 17.

The fire suppression arrangement 1 comprises a remote computer system RCS configured to detect and compare real time temperatures of the electrochemical unit 3.

Each control unit 11 is associated with the remote computer system RCS via a communication protocol, and is configured to compare, in a back-up comparison execution, a real time temperature change and/or temperature of the electrochemical unit 3 detected by the remote computer system RCS, with a pre-set indicative temperature change and/or temperature pre-set in the control unit 11.

The remote computer system RCS may be configured to monitor different temperatures of different electrochemical units 3 in any battery pack and is configured to identify at least one temperature change and/or temperature of at least one electrochemical unit 3 deviating from at least one pre-set indicative temperature change and/or temperature of that electrochemical unit 3 depending on the actual status or mode of the electrochemical unit 3.

Alternatively, the fire suppression system 1 is configured to be coupled to a screening unit 22 for testing and/or analysis and/or survey screening and/or re-programming of the respective control unit 11 and/or the central control circuitry 11' of the fire suppression arrangement 1.

Alternatively, the remote computer system RCS communicates via a communication protocol with the control units 11 and is configured to communicate with fire departments 24 about present status of the fire suppression arrangement 1 and/or sending mass notification in case of fire.

Alternatively, the control unit 11 is coupled to a battery management system 12, which is configured to disconnect the electrochemical unit 3 from a charging source and/or a power consuming device (not shown).

Alternatively, the control unit 11 thus being configured to switch off the electrochemical unit 3 by means of the battery management system 12, if a detected carbon monoxide and/or a methane gas characters/character exceed/exceeds and/or reach/reaches and/or correspond/corresponds with a pre-set indicative carbon monoxide and/or a methane gas characters/character.

Alternatively, the control unit 11 is configured to command discharge of the fire extinguishing fluid on and/or into and/or fully around and/or partly around the electrochemical unit 3, if the detected carbon monoxide and/or methane gas characters/character exceed/exceeds and/or reach/reaches and/or correspond/corresponds with the pre-set indicative carbon monoxide and/or methane gas characters/character.

Figure 6:
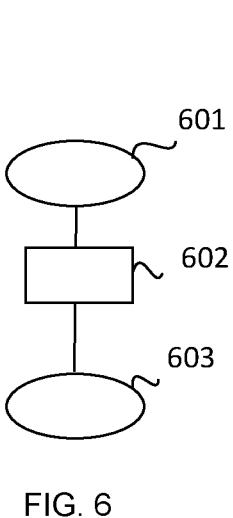
FIG. 6 illustrates a flowchart showing an exemplary method of reducing heat output of an electrochemical unit by means of a fire suppression system.

FIG. 6 illustrates a flowchart showing an exemplary method of reducing heat output of an electrochemical unit by means of a fire suppression system. FIG. 6 illustrates a flow chart of a method of reducing heat output of an electrochemical unit by means of a fire suppression system. The method starts in a Step 601. In Step 602 the method is carried out. The fire suppression system is configured to reduce heat output of an electrochemical unit by means of a fire extinguishing fluid encompassed in a fire extinguishing fluid container arranged adjacent to and/or in contact with the electrochemical unit, wherein the fire suppression system comprises; an outlet device coupled to the fire extinguishing fluid container and configured to discharge the fire extinguishing fluid upon command; a gas detector device associated with the electrochemical unit and configured for detecting at least one gas character; a control unit coupled to the gas detector device and configured to, in a first comparison execution, compare said at least one gas character with at least one pre-set indicative gas character; and the control unit is further configured to command the outlet device to discharge the fire extinguishing fluid on and/or into and/or fully around and/or partly around the electrochemical unit, if the first comparison execution signifies that the detected gas character corresponds with the pre-set indicative gas character. In Step 603 the method is stopped.

The step 602 may comprise the steps of; arranging the fire extinguishing fluid container adjacent or in contact with the electrochemical unit; filling the fire extinguishing fluid container with the extinguishing fluid before or after said arranging step; detecting a gas leakage from the electrochemical unit; performing said first comparison execution; and commanding the outlet device to discharge the fire extinguishing fluid if the detected gas character corresponds with the pre-set indicative gas character.

Figure 7:
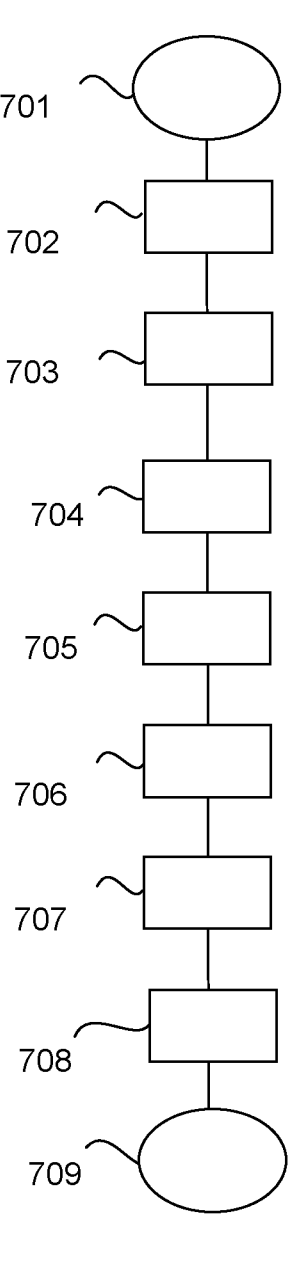
FIG. 7 illustrates a flowchart showing an exemplary method of reducing heat output of an electrochemical unit by means of a fire suppression system.

FIG. 7 illustrates a flow chart of an exemplary method. The method starts in Step 701. Step 702 includes positioning of the electrochemical unit in a protective housing. Step 703 comprises discharge of the fire extinguishing fluid into the protective housing. Step 704 comprises detecting a temperature change and/or temperature of the electrochemical unit by means of a temperature detector device of the fire suppression system. Step 705 comprises the procedure of comparing, in a second comparison execution, the temperature change and/or temperature with a pre-set indicative temperature change and/or temperature. Step 706 comprises the procedure of commanding the outlet device to discharge the fire extinguishing fluid if the detected temperature change and/or temperature corresponds with a pre-set indicative temperature change and/or temperature.

Alternatively, step 707 comprises coupling the control unit to a communication protocol of an automotive computer system. Step 708 may comprises comparing in a back-up automotive comparison execution, a real time temperature change and/or temperature of the electrochemical unit detected by the automotive computer system with a pre-set indicative temperature change and/or temperature set in a program of the control unit. In Step 709 the method is stopped.

Figure 8:
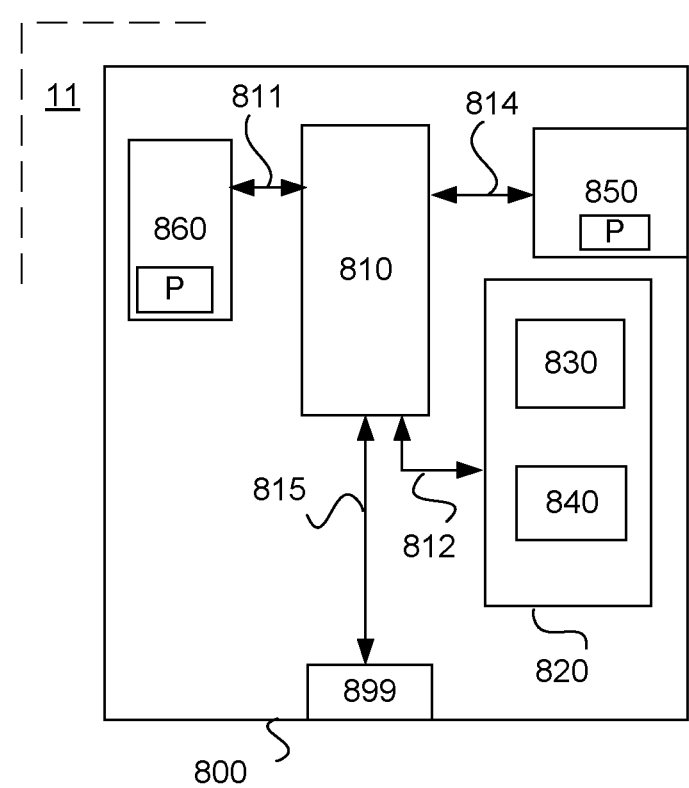
FIG. 8 illustrates a control unit configured to manage an exemplary method of reducing heat output of an electrochemical unit by means of a fire suppression system.

FIG. 8 illustrates a computer 800 configured to control the method according to an example. A control unit 11 of the fire suppression system may comprise the computer 800. The computer 800 comprises a non-volatile memory NVM 820, which is a computer memory that can retain stored information even when the computer 800 is not powered. The computer 800 further comprises a processing unit 810 and a read/write memory 850. The NVM 820 comprises a first memory unit 830. A computer program (which can be of any type suitable for any operational database) is stored in the first memory unit 830 for controlling the functionality of the computer 800.

Furthermore, the computer 800 comprises a bus controller (not shown), a serial communication port (not shown) providing a physical interface, through which information transfers separately in two directions. The computer 800 also comprises any suitable type of I/O module (not shown) providing input/output signal transfer, an ND converter (not shown) for converting continuously varying signals from a gas detector and/or temperature detector (not shown) of the fire suppression system and different monitoring units (not shown) into binary code suitable for the computer 800.

The computer 800 also comprises an input/output unit (not shown) for adaption to time and date. The computer 800 also may comprises an event counter (not shown) for counting the number of event multiples that occur from independent events in the fire suppression system. Furthermore, the computer 800 includes interrupt units (not shown) associated with the computer for providing a multi-tasking performance and real time computing. The NVM 820 also includes a second memory unit 840 for external controlled operation.

A data medium storing program P comprising driver routines adapted for commanding the outlet device to discharge the fire extinguishing fluid if the detected gas character corresponds with the pre-set indicative gas character.

The data medium storing program P may be provided for operating the computer 800 for performing any exemplary method described herein. The data medium storing program P comprises routines for causing said command. The data medium storing program P comprises a program code stored on a medium, which is readable on the computer 800, for causing the computer 800 to perform said method.

The data medium storing program P further may be stored in a separate memory 860 and/or in a read/write memory 850. The data medium storing program P is in this embodiment stored in executable or compressed data format.

It is to be understood that when the processing unit 810 is described to execute a specific function that involves that the processing unit 810 executes a certain part of the program stored in the separate memory 860 or a certain part of the program stored in the read/write memory 850.

The processing unit 810 is associated with a data port 899 for communication via a first data bus 815. The non-volatile memory NVM 820 is adapted for communication with the processing unit 810 via a second data bus 812. The separate memory 860 is adapted for communication with the processing unit 810 via a third data bus 811. The read/write memory 850 is adapted to communicate with the processing unit 810 via a fourth data bus 814. The data port 899 may be connectable to data links of e.g. an automotive computer system.

When data is received by the data port 899, the data will be stored temporary in the second memory unit 840. After that the received data is temporary stored, the processing unit 810 will be ready to execute the program code, in accordance with the above-mentioned method. Preferably, the signals (received by the data port 899) comprise information about operational status of the fire suppression system, such as status of the fire extinguishing fluid container and/or status of the electrochemical unit and/or status of the gas detector device and/or status of the temperature detector device and/or status of the outlet device.

The received signals at the data port 899 can be used by the computer 800 for controlling and monitoring the of the fire suppression system in a cost-effective way.

The signals received by the data port 899 can be used for historic data and facts regarding the operation of the fire suppression system. Data may also be manually fed to or presented from the control unit via a suitable communication device, such as a personal computer display.

Separate sequences of the method can also be executed by the computer 800 and the control unit, which control unit runs the data medium storing program P being stored in the separate memory 860 or the read/write memory 850. When the computer 800 runs the data medium storing program P, suitable method steps disclosed herein will be executed.

A data medium storing program product comprising a program code stored on a medium is provided, which product is readable on a suitable computer, for performing the exemplary method steps herein, when the data medium storing program P is run on the control unit 11.

Figures 9, 10, 11, 12:
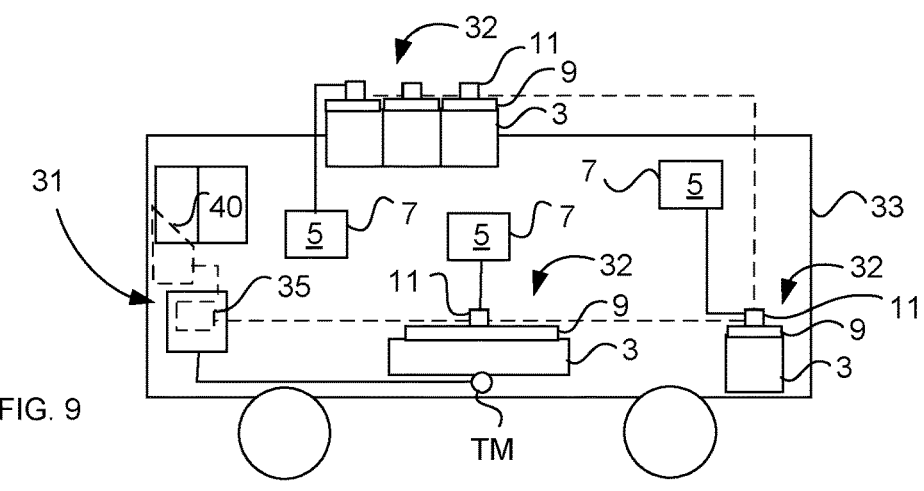
FIG. 9 illustrates an automotive fire suppression system according to one aspect.
FIG. 10 illustrates an automotive fire suppression system according to one aspect.
FIG. 11 illustrates an automotive fire suppression system according to one aspect.
FIG. 12 illustrates an automotive fire suppression system according to one aspect.

FIG. 9 shows a vehicle 33 comprising an automotive fire suppression system 31. The automotive fire suppression system 31 is configured to reduce heat output of a battery pack 3 of the vehicle 33 in case of overheating and/or fire of the battery pack 3.

Alternatively, the automotive fire suppression system 31 comprises (and/or is coupled to) a plurality of secondary fire suppression systems 32, which are coupled to a central automotive computer system 35 of the vehicle 33.

Alternatively, the automotive computer system 35 comprises temperature sensor TM, a central processing unit (not shown) configured for processing data regarding pre-set temperature data with detected temperatures, a memory unit (not shown) configured for storing a program and configured for storing the data to be processed and an input/output unit configured for communicating with a user via a user interface presenting on the user interface (e.g. a display 40) information of an overheated battery pack 3 and/or alarming passengers and/or the driver (not shown) in case of need of evacuating the vehicle 33 and/or automatic alerting fire departments and/or sending mass notification and/or displaying gas and heat detection notification.

The vehicle 33 comprises a plurality of battery packs 3 and fire extinguishing fluid containers 7.

The automotive fire suppression system 31 makes use of fire extinguishing fluid 5 encompassed in the respective fire extinguishing fluid container 7 arranged adjacent or remote to the respective battery pack 3.

Each secondary fire suppression system 32 comprises a fire extinguishing fluid outlet 9, which is configured for fluid communication with the fire extinguishing fluid container 7.

The fire extinguishing fluid outlet 9 is configured to discharge the fire extinguishing fluid 5 upon command from a respective control unit 11 of each secondary fire suppression system 32.

A respective gas detector (not shown) is arranged adjacent the respective battery pack 3. The respective gas detector is configured for detecting at least one gas character of a specific gas eventually leaking from any battery pack 3, when the temperature of a battery cell of that battery pack 3 increases over normal operating temperature.

The automotive computer system 35, which is configured to monitor the temperature and/or temperature changes in different battery packs 3 of the vehicle 33, and which may be configured to identify at least one temperature change and/or temperature of at least one battery pack 3 deviating from at least one pre-set indicative temperature change and/or temperature of that battery pack 3 depending on the driving mode of the vehicle 33.

The automotive computer system 35 is configured to be coupled to or associated with each secondary fire suppression system 32 via a respective control unit 11 of each secondary fire suppression system 32.

Each control unit 11 is coupled to the gas detector for rapidly detection of overheated battery cell of any battery pack 3.

The respective control unit 11 may be configured to continuously, in a first comparison execution, compare a detected gas character with at least one pre-set indicative gas character, which is pre-set in the respective control unit 11.

Each control unit 11 is configured to send command signals to the respective fire extinguishing fluid outlet 9 being mounted adjacent the respective battery pack 3.

The control unit 11 may be configured to command the fire extinguishing fluid outlet 9 to discharge the fire extinguishing fluid 5 over the battery pack 3 in case the pre-set indicative gas character corresponds with or exceeds a specific concentration of the detected gas character.

The respective control unit 11 may use a specific data medium and/or a common a data medium configured for controlling the automotive fire suppression system 31. The data medium comprises a program code being readable on the control unit 11 for performing the method of reducing eventual exceeding heat output of the battery cell 3.

The control code may be programmed and pre-set with the indicative gas character, which indicative gas character is determined from earlier try-outs in laboratory and experience analysing any gas character leaking from the battery cell 3 prior the battery cell catches fire.

Alternatively, the respective control unit 11 may be configured to command opening of a valve (not shown) and/or rupture of a respective tearable membrane of the respective fire extinguishing fluid outlet 9, or command opening in any suitable way.

The fire extinguishing fluid 5 flowing through the actuated fire extinguishing fluid outlet 9 being able to be discharged on and/or into and/or fully around and/or partly around the heated battery cell and/or battery pack 3, if the first comparison execution signifies that the detected gas character corresponds with the pre-set indicative gas character.

By the detection of a gas character and by means of the first comparison execution, an eventual fire of the battery cell and consequently also any fire of adjacent battery cells can be delayed or even extinguished by the automotive fire suppression system 31. There is thus achieved sufficient time for evacuating the driver and/or passengers from the vehicle 33.

Alternatively, the secondary fire suppression system 32 may comprise complementary temperature detectors (not shown) coupled to the respective control unit 11, which temperature detectors are configured for detecting a temperature change and/or temperature of at least one battery cell.

Alternatively, at least one temperature detector is mounted within the battery cell or surface mounted on the battery cell casing or on the battery pack 3 or in any suitable position for proper detection of the temperature.

The respective control unit 11 is associated with and communicates with the automotive computer system 35 of the automotive fire suppression system 31 of the vehicle 33. Each control unit 11 of the secondary fire suppression system 32 is coupled to the automotive computer system 35 via a communication protocol.

The respective control unit 11 is configured to compare, in a back-up automotive comparison execution, a real time temperature change of the battery pack 3.

The real time temperature change may be detected by the automotive computer system 35 by means of a respective automotive battery temperature sensor (not shown) of the automotive computer system 35.

The back-up automotive comparison execution is made by comparing the real time temperature change with a pre-set indicative temperature change and/or temperature pre-set in each control unit 11.

The automotive fire suppression system 31 may comprise the fire extinguishing fluid 5 encompassed in the fire extinguishing fluid container 7 configured to be arranged remote and/or adjacent to and/or in contact with the automotive electrochemical unit.

The automotive fire suppression system 31 may be configured to discharge the fire extinguishing fluid 5 over the battery pack 3 upon command from the automotive computer system 35 of the automotive fire suppression system 31 and/or from the control unit 11 of the secondary fire suppression system 32.

Alternatively, the secondary fire suppression system 32 corresponds with the fire suppression system disclosed herein.

Alternatively, the automotive computer system 35 and control unit 11 being configured to command discharge of the fire extinguishing fluid 5 on and/or into and/or fully around and/or partly around the automotive electrochemical unit (such as the battery pack 3), in case the automotive electrochemical unit is overheated.

Alternatively, the at least one gas character can be detected by the gas detector device of the secondary fire suppression system 32, which gas detector device being associated with and/or positioned adjacent the electrochemical unit and configured for detecting at least one gas character.

Alternatively, according to one aspect, the automotive computer system 35 is configured to be coupled to the control unit 11 of the secondary fire suppression system 32, comprising the gas detector, via a serial bus configured for electrical interface explicitly providing electrical compatibility and related data transfer, which data regards real time temperature change and/or temperature of the automotive electrochemical unit detected by a temperature sensor of the automotive fire suppression system 31, and which data may regard the at least one gas character, eventually generated by the automotive electrochemical unit and detected by the secondary fire suppression system.

Alternatively, a temperature sensor of the automotive fire suppression system 31 being coupled to the automotive computer system 35 for detecting a temperature change and/or temperature of the automotive electrochemical unit.

Alternatively, the secondary fire suppression system 32 is configured to be a complementary system to the automotive fire suppression system 31.

Alternatively, the secondary fire suppression system 32 is configured to take into account the detection of a temperature change and/or temperature of the automotive electrochemical unit made by the automotive fire suppression system 31, wherein the control unit 11 is configured to command discharge of the fire extinguishing fluid 5 on and/or into and/or fully around and/or partly around the automotive electrochemical unit, in case the automotive electrochemical unit is overheated.

Alternatively, the secondary fire suppression system 32 is configured to take into account the detection of the at least one gas character, detected by the secondary fire suppression system 32, wherein the control unit 11 is configured to command discharge of the fire extinguishing fluid 5 on and/or into and/or fully around and/or partly around the automotive electrochemical unit, in case the automotive electrochemical unit is overheated.

Alternatively, the automotive fire suppression system 31 is configured to take into account the detection of a temperature change and/or temperature detected by the secondary fire suppression system 32, wherein the automotive computer system 35 is configured to command discharge of the fire extinguishing fluid 5 on and/or into and/or fully around and/or partly around the automotive electrochemical unit, in case the automotive electrochemical unit is overheated.

Alternatively, the primary fire suppression system 31 is configured to take into account the detection of the at least one gas character, detected by the secondary fire suppression system 32, wherein the automotive computer system 35 is configured to command discharge of the fire extinguishing fluid 5 on and/or into and/or fully around and/or partly around the automotive electrochemical unit, in case the automotive electrochemical unit is overheated.

Alternatively, the first comparison execution is configured to prevail over the automotive comparison execution.

In such way, the automotive fire suppression system 31 is provided with reliability and redundancy.

FIG. 10 illustrates an automotive fire suppression system 31 according to one aspect. A vehicle 33 comprises a battery pack 3 associated with the automotive fire suppression system 31 comprising a fire suppression apparatus 44.

A secondary fire suppression system 32 comprises gas detectors 13 for early detection of an eventually heated battery cell of the battery pack 3.

Alternatively, the automotive fire suppression system 31 is coupled to the secondary fire suppression system 32 over a communication protocol. Wherein the communication is directed in two-ways between the automotive fire suppression system 31 and the secondary fire suppression system 32 regarding information about the status of at least one battery cell.

The automotive fire suppression system 31 may make use information about eventual gas leakage from the battery pack 3 resulting in that the automotive fire suppression system 31 activates the fire suppression apparatus 44 for reducing heat of the battery pack 3.

FIG. 11 illustrates an automotive fire suppression system 31 according to one aspect.

Alternatively, the automotive fire suppression system 31 comprises at least one secondary fire suppression system 32 being coupled to a central automotive computer system 35 of a vehicle (not shown).

The central automotive computer system 35 is configured to monitor different temperatures of different electrochemical units in a battery pack of the vehicle and is configured to identify at least one temperature change and/or temperature of at least one electrochemical unit 3 deviating from at least one pre-set indicative temperature change and/or temperature of that electrochemical unit 3 depending on the driving mode of the vehicle.

Information, regarding status of the battery cells of the battery pack 3, extracted by the central automotive computer system 35, is used by the at least one control unit 11 of the at least one secondary fire suppression system 32.

The information is communicated by two-way communication between the central automotive computer system 35 and the at least one secondary fire suppression system 32.

The at least one control unit 11 is configured to extract said information, fully or in part, from the central automotive computer system 35, in purpose to use the information in monitoring purpose.

If the at least one control unit 11 of the secondary fire suppression system 32 notifies that the temperature of the electrochemical unit 3 rises above a pre-set temperature, the at least one control unit 11 commands a fire extinguishing fluid outlet 9 to open and apply a fire extinguishing fluid 5 over and or around fully covering the overheated electrochemical unit 8.

FIG. 12 illustrates an automotive fire suppression system 31 of a vehicle 33 according to one aspect.

The automotive fire suppression system 31 may comprise at least one secondary fire suppression system 32 and an automotive computer system 35.

The automotive fire suppression system 31 is configured to reduce exceeding heat output of an electric battery 3 by means of a fire extinguishing fluid 5. The fire extinguishing fluid 5 is stored in a container 7 arranged adjacent the electric battery 3. The automotive fire suppression system 31 comprises a fire extinguishing fluid outlet 9 having a valve (not shown) controlled by the control unit 11.

The fire extinguishing fluid outlet 9 is configured for fluid communication with the container 7 and is configured to discharge the fire extinguishing fluid 5 upon command from the automotive computer system 35 or from the control unit 11 of the secondary fire suppression system 32 coupled to the controllable valve.

The automotive fire suppression system 31 may comprise at least one gas detector 13 positioned above and adjacent the electric battery 3.

Each gas detector 13 is coupled to the control unit 11 for detecting at least one gas character of a gas that eventually leaks from the electric battery 3. The detected gas character can be recognized by the control unit 11 coupled to the gas detector 13, wherein the control unit 11, in a first comparison execution, compares the gas character with a pre-set indicative gas character. The pre-set indicative gas character is before-hand programmed as data setup in a program code of the control unit 11.

The automotive fire suppression system 31 further comprises at least one temperature detector 15 positioned interior battery cells of the electric battery 3 (alternatively positioned adjacent or onto the surface of the battery cells) and being coupled to the control unit 11, configured for detecting a temperature change and/or temperature of the electric battery 3.

The gas detection is thus supported by the temperature detection, which is made by the control unit 11 performing a first comparison execution regarding the gas detection and performing a second comparison execution regarding the temperature detection.

In such way, the automotive fire suppression system is provided with reliability and redundancy.

The automotive computer system 35 of the vehicle 33 is coupled to the control unit 11 of the secondary fire suppression system 32. Information regarding the status and temperature is communicated between the automotive computer system 35 and the control unit 11 via a communication protocol.

The automotive computer system 35 may be configured to be coupled to the control unit 11 of the secondary fire suppression system 32 via a serial bus 40 configured for electrical interface explicitly providing electrical compatibility and related data transfer, which data may regard real time temperature change and/or temperature of the automotive electrochemical unit detected by a temperature sensor of the automotive fire suppression system 31 and which data may regard the at least one gas character, eventually generated by the automotive electrochemical unit 3 and detected by the secondary fire suppression system 32.

The automotive computer system 35 of the automotive fire suppression system 31 is configured to compare, in a back-up automotive comparison execution, a real time temperature change and/or temperature of the automotive electrochemical unit 3 detected by the automotive computer system 35, with a pre-set indicative temperature change and/or temperature pre-set in the control unit 11.

In such way, the automotive fire suppression system 31 is provided with even higher reliability and redundancy.

The automotive computer system 35 and/or automotive fire suppression system 31 being configured to command a fire extinguishing fluid outlet 9 to discharge the fire extinguishing fluid 5 on and/or into and/or fully around and/or partly around the automotive electrochemical unit 3, in case the automotive electrochemical unit is overheated.

Figures 13, 14, 15:
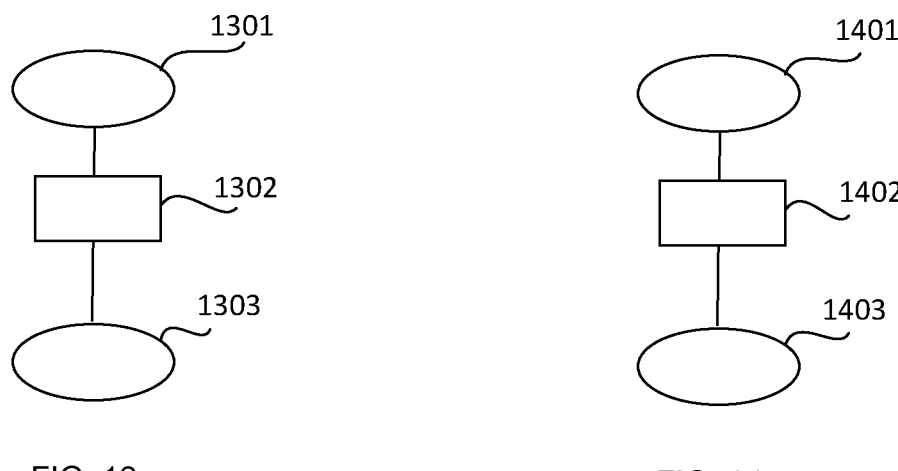
FIG. 13 illustrates a flowchart showing a method of reducing heat output of an automotive electrochemical unit by means of an automotive fire suppression system according to one aspect.
FIG. 14 illustrates a flowchart showing a method of reducing heat output of an automotive electrochemical unit by means of an automotive fire suppression system according to one aspect.
FIG. 15 illustrates an automotive computer system configured to manage reducing heat output of an automotive electrochemical unit by means of an automotive fire suppression system according to one aspect.

FIG. 13 illustrates a flowchart showing a method of reducing heat output of an automotive electrochemical unit by means of an automotive fire suppression system according to one aspect. The method may comprise signalling the real time temperature change and/or temperature of the automotive electrochemical unit detected by the automotive computer system to the control unit of the automotive fire suppression system, wherein the control unit of the automotive fire suppression system commands the fire extinguishing fluid outlet to discharge the fire extinguishing fluid.

The automotive fire suppression system comprises at least one automotive fire suppression system; a fire extinguishing fluid encompassed in fire extinguishing fluid container configured to be arranged adjacent to and/or in contact with the automotive electrochemical unit; and at least one fire extinguishing fluid outlet coupled to the fire extinguishing fluid container and configured to discharge the fire extinguishing fluid upon command.

Step 1301 starts the method. Step 1302 comprises the method steps of proving the method. In step 1303 the method is stopped.

Step 1302 may comprise; arranging the fire extinguishing fluid container in the vehicle; filling the fire extinguishing fluid container with the extinguishing fluid before or after said arranging step; coupling the automotive computer system of the primary fire suppression system to the control unit of the secondary fire suppression system via a communication protocol; comparing in an automotive comparison execution, a real time temperature change and/or temperature of the automotive electrochemical unit detected by the primary fire suppression system, with an indicative temperature change and/or indicative temperature of the automotive electrochemical unit pre-set in the control unit; and comparing in a first comparison execution, at least one gas character, generated by the automotive electrochemical unit and detected by the secondary fire suppression system, with at least one indicative gas character pre-set in the control unit of the secondary fire suppression system; commanding discharge of the fire extinguishing fluid, if either of the automotive comparison execution or the first comparison execution and/or both comparison executions implies that an indicative limit is exceeded.

The definition of the indicative limit may involve a first value of the detected gas character content and/or concentration of the gas leaking electrochemical unit, which first value is set to be indicative for starting discharge of the fire extinguishing fluid.

The definition of the indicative limit may involve a second value of the detected temperature of the automotive electrochemical unit, which second value is set to be indicative for starting discharge of the fire extinguishing fluid.

The automotive computer system 35 and/or the automotive fire suppression system 31 being configured to command the fire extinguishing fluid outlet 9 to discharge the fire extinguishing fluid on and/or into and/or fully around and/or partly around the automotive electrochemical unit, in case the automotive electrochemical unit is overheated.

FIG. 14 illustrates a flowchart showing a method of reducing heat output of an automotive electrochemical unit by means of an automotive fire suppression system according to one aspect.

Step 1401 starts the method. Step 1402 comprises; signalling the real time temperature change and/or temperature of the automotive electrochemical unit detected by the automotive computer system to the control unit of the automotive fire suppression system, wherein the control unit of the automotive fire suppression system commands the fire extinguishing fluid outlet to discharge the fire extinguishing fluid. In step 1403 the method is stopped.

FIG. 15 illustrates an automotive fire suppression system 31 configured to manage reducing heat output of an automotive electrochemical unit 3 according to one aspect.

The automotive fire suppression system 31 comprises an automotive computer system 1500 configured to control an exemplary method described herein. The automotive computer system 1500 of the automotive fire suppression system 31 may comprise a non-volatile memory NVM 1520, which is a computer memory that can retain stored information even when the automotive computer system 1500 not being powered. The automotive computer system 1500 further comprises a processing unit 1510 and a read/write memory 1550. The NVM 1520 comprises a first memory unit 1530. A computer program (which can be of any type suitable for any operational database) is stored in the first memory unit 1530 for controlling the functionality of the automotive computer system 1500.

Furthermore, the automotive computer system 1500 comprises a bus controller (not shown), a serial communication port (not shown) providing a physical interface, through which information transfers separately in two directions. The automotive computer system 1500 also comprises any suitable type of I/O module (not shown) providing input/output signal transfer, an ND converter (not shown) for converting continuously varying signals from a gas detector and/or temperature detector (not shown) of the fire suppression system and different monitoring units (not shown) into binary code suitable for the automotive computer system 1500.

The automotive computer system 1500 also comprises an input/output unit (not shown) for adaption to time and date. The automotive computer system 1500 also may comprise an event counter (not shown) for counting the number of event multiples that occur from independent events in the fire suppression system. Furthermore, the automotive computer system 1500 includes interrupt units (not shown) associated with the computer for providing a multi-tasking performance and real time computing. The NVM 1520 also includes a second memory unit 1540 for external controlled operation.

A data medium storing program P comprising driver routines adapted for commanding the outlet device to discharge the fire extinguishing fluid if the detected gas character corresponds with the pre-set indicative gas character.

The data medium storing program P may be provided for operating the automotive computer system 1500 for performing any exemplary method described herein. The data medium storing program P comprises routines for causing said command. The data medium storing program P comprises a program code stored on a medium, which is readable on the automotive computer system 1500, for causing the automotive computer system 1500 to perform said method.

The data medium storing program P further may be stored in a separate memory 1560 and/or in a read/write memory 1550. The data medium storing program P is in this embodiment stored in executable or compressed data format.

It is to be understood that when the processing unit 1510 is described to execute a specific function that involves that the processing unit 1510 executes a certain part of the program stored in the separate memory 1560 or a certain part of the program stored in the read/write memory 1550.

The processing unit 1510 is associated with a data port 1599 for communication via a first data bus 1515. The non-volatile memory NVM 1520 is adapted for communication with the processing unit 1510 via a second data bus 1512. The separate memory 1560 is adapted for communication with the processing unit 1510 via a third data bus 1511. The read/write memory 1550 is adapted to communicate with the processing unit 1510 via a fourth data bus 814. The data port 1599 may be connectable to data links of e.g. an automotive computer system comprising the automotive computer system 1500.

When data is received by the data port 1599, the data will be stored temporary in the second memory unit 1540. After that the received data is temporary stored, the processing unit 1510 will be ready to execute the program code, in accordance with the above-mentioned method. Preferably, the signals (received by the data port 1599) comprise information about operational status of the fire suppression system, such as status of the fire extinguishing fluid container and/or status of the electrochemical unit and/or status of the gas detector device and/or status of the temperature detector device and/or status of the outlet device.

The received signals at the data port 1599, such as a serial bus, may be used by the automotive computer system 1500 for controlling and monitoring the automotive fire suppression system 31 in a cost-effective way.

The signals received by the data port 1599 can be used for historic data and data regarding the operation of the automotive fire suppression system 31 and/or secondary fire suppression system 32.

The automotive computer system 35 may be configured to be coupled to a control unit (not shown) of a secondary fire suppression system 32 via the serial bus configured for electrical interface explicitly providing electrical compatibility and related data transfer, which data includes real time temperature change and/or temperature of an automotive electrochemical unit detected by a temperature sensor of the automotive fire suppression system 31 and which data includes the at least one gas character, eventually generated by the automotive electrochemical unit (not shown) and detected by the secondary fire suppression system 32.

Data may also be manually fed to or presented from the control unit via a suitable communication device, such as a personal computer display (not shown).

Separate sequences of the method can also be executed by the automotive computer 1500 and the control unit, which control unit runs the data medium storing program P being stored in the separate memory 1560 or the read/write memory 1550. When the automotive computer system 1500 runs the data medium storing program P, suitable method steps disclosed herein will be executed. A data medium storing program product comprising a program code stored on a medium is provided, which product is readable on a suitable computer, for performing the exemplary method steps herein, when the data medium storing program P is run on the control unit.

FIG. 16 illustrates a diagram emphasising detection of CO (carbon monoxide) by means of a gas detector device of the fire suppression system (not shown), wherein the detection of increased vol. % (CO) in time precedes the moment when temperature increases and overheating is a fact. It is shown in FIG. 16 that the emission of CO increases and reaches over 5 Vol. % due to internal exothermic process driven by the chemical composition within a battery cell (not shown) of the electrochemical unit. A time period later (about 5 minutes later) the temperature reaches nearly 200° C.

Alternatively, e.g. lithium-ion batteries, when entering a possible state of failure, undergoes an internal exothermic process driven by the chemical composition within the battery cell of the electrochemical unit. The process also generates an overpressure within the battery cell. To prevent explosions of the battery cell, the battery cells and/or the electrochemical unit may comprise venting means to vent this overpressure at a defined pressure.

Alternatively, if the venting means vents this overpressure at the defined pressure registered by a control unit (not shown) by means of a pressure sensor device (not shown) associated with the battery cell and/or this overpressure is registered by the pressure sensor device, this does not mean that the battery cell has entered a thermal runaway point and undergoes overheating, but it is a definite indication that a process to eventually reach the thermal runaway point has started.

The composition of the emitted gases varies slightly between different battery chemistries but there are some common factors. The emitted gases may consist of a mixture of Hydrocarbons like $CH_4$ (methane), $C_2H_4$ (ethylene), $C_2H_6$ (ethane) as well as $H_2$ (hydrogen), $CO_2$ (carbon dioxide), and CO (carbon monoxide).

As gas sensors for hydrogen as well as ethylene and ethane are quite expensive and normally have a limited life span, and $CO_2$ could be used as an active cooling agent, the present invention makes use of detection of the carbon monoxide and/or methane.

Alternatively, the gas detector device is configured to detect carbon monoxide and/or methane emitted from the electrochemical unit.

Alternatively, the gas detector device is combined with the pressure sensor device for detection of said overpressure and said detection of emitted carbon monoxide and/or methane from the battery cell.

Alternatively, the control unit is coupled to the gas detector device and is configured to, in a first comparison execution, compare said detected carbon monoxide and/or methane with at least one pre-set indicative carbon monoxide and/or methane gas character.

The carbon monoxide is dominant over methane, which implies fast response promoting an early warning functionality of the fire suppression system.

Alternatively, the control unit is coupled to the gas detector device and configured to, in a first comparison execution, compare said detected carbon monoxide with at least one pre-set indicative carbon monoxide gas character.

The point when the emission of measurable CO increases occurs earlier than when temperature of the battery cell increases.

It should also be noted that the efficiency of a fire suppression system strongly depends on how early it is deployed.

By this early detection of CO emission (e.g. at the time for said venting by means of the venting means) from the electrochemical unit, there is achieved an active fire suppression system preventing heat build-up in the battery cells of the electrochemical unit.

The present invention is of course not in any way restricted to the preferred examples described above, but many possibilities to modifications, or combinations of the described examples, thereof should be apparent to a person with ordinary skill in the art without departing from the basic idea of the invention as defined in the appended claims.

The term 'battery pack' may denote a plurality of battery modules interconnected to achieve required voltage for an application. In some designs, battery pack consists of plurality of individual batteries without some additional grouping forming battery module.

The term 'battery compartment' may refer to single or plurality of battery packs storage spaces in a vehicle; like vehicle roof space, rear spaces but not limited.

The invention claimed is:

1. A method of reducing heat output of an electrochemical unit by an automotive fire suppression system of a vehicle and comprising:

a fire extinguishing fluid container arranged adjacent to and/or in contact with the automotive electrochemical unit, the fire extinguishing fluid container adapted to hold a fire extinguishing fluid for reducing heat output of the automotive electrochemical unit, the fire extinguishing fluid being a liquid; and a secondary fire suppression system adapted to be coupled to an automotive computer system of the vehicle, the secondary fire suppression system comprising:

an outlet device coupled to the fire extinguishing fluid container and configured to discharge the fire extinguishing fluid upon command;

a gas detector associated with the automotive electrochemical unit and configured for detecting at least one gas character;

a control unit coupled to the gas detector and configured to, in a first comparison execution, compare said at least one gas character with at least one pre-set indicative gas character;

wherein the control unit is configured to command the outlet device to discharge the fire extinguishing fluid on and/or into and/or fully around and/or partly around the automotive electrochemical unit if the first comparison execution signifies that the detected gas character corresponds with the pre-set indicative gas character; the method comprising the steps of:

positioning the automotive electrochemical unit in a protective housing;

arranging the fire extinguishing fluid container adjacent or in contact with the automotive electrochemical unit;

filling the fire extinguishing fluid container with the extinguishing fluid prior or after said arranging step;

detecting a gas leakage from the automotive electrochemical unit via the gas detector;

performing said first comparison execution;

commanding the outlet device to discharge the fire extinguishing fluid if the detected gas character corresponds with the pre-set indicative gas character;

detecting a temperature change and/or temperature of the automotive electrochemical unit by a temperature detector coupled to the control unit;

comparing, in a second comparison execution, the temperature change and/or temperature of the automotive electrochemical unit with a pre-determined temperature change and/or a temperature;

commanding the outlet device to discharge the fire extinguishing fluid if the detected temperature change and/or temperature corresponds with a pre-set indicative temperature change and/or temperature;

wherein the first comparison execution is configured to prevail over the second comparison execution; and the step of discharging the fire extinguishing fluid comprises discharge of the fire extinguishing fluid into the protective housing.

2. The method according to claim 1, wherein the method further comprises the steps of:

coupling the control unit to a communication protocol of the automotive computer system; and comparing, in a back-up automotive comparison execution, a real time temperature change and/or temperature of the automotive electrochemical unit detected by the automotive computer system with a pre-set indicative temperature change and/or a temperature set in a program of the control unit.

3. An automotive fire suppression system of a vehicle, the automotive fire suppression system comprising:

an automotive electrochemical unit;

a fire extinguishing fluid container arranged adjacent to and/or in contact with the automotive electrochemical unit, the fire extinguishing fluid container adapted to hold a fire extinguishing fluid for reducing heat output of the automotive electrochemical unit, the fire extinguishing fluid being a liquid; and a secondary fire suppression system adapted to be coupled to an automotive computer system of the vehicle, the secondary fire suppression system comprising:

an outlet device coupled to the fire extinguishing fluid container and configured to discharge the fire extinguishing fluid upon command;

a gas detector associated with the automotive electrochemical unit and configured for detecting at least one gas character;

a control unit coupled to the gas detector and configured to, in a first comparison execution, compare said at least one gas character with at least one pre-set indicative gas character;

wherein the control unit is further configured to command the outlet device to discharge the fire extinguishing fluid on and/or into and/or fully around and/or partly around the automotive electrochemical unit, if the first comparison execution signifies that the detected gas character corresponds with the preset indicative gas character; and a temperature detector coupled to the control unit and configured for detecting a real-time temperature change and/or temperature of the automotive electrochemical unit;

wherein the control unit is configured to, in a second comparison execution, compare the real time temperature change and/or temperature of the automotive electrochemical unit with a pre-determined temperature change;

wherein the control unit is configured to command the outlet device to discharge the fire extinguishing fluid if the detected temperature change and/or temperature corresponds with a pre-set indicative temperature change and/or temperature; and wherein the first comparison execution is configured to prevail over the second comparison execution.

4. The automotive fire suppression system according to claim 3, wherein the automotive electrochemical unit is arranged in a protective housing; and the outlet device is configured to discharge the fire extinguishing fluid into the protective housing.

5. The automotive fire suppression system of claim 3, wherein the automotive electrochemical unit includes an electric battery, and wherein the gas detector and/or the temperature detector is positioned inside the electric battery.

6. The automotive fire suppression system of claim 5, wherein the electric battery comprises a plurality of battery cells, and wherein the secondary fire suppression system comprises a plurality of gas detectors, each of the gas detectors positioned on a battery cell of the plurality of battery cells or between adjacent battery cells of the plurality of battery cells.

7. The automotive fire suppression system of claim 5, wherein the electric battery is positioned in a protective housing, and wherein the fire extinguishing fluid container is disposed outside of the protective housing.

8. A vehicle, comprising:

the automotive fire suppression system according to claim 3; and the automotive computer system.

9. The vehicle according to claim 8, wherein the control unit is adapted to be associated with the automotive computer system via a communication protocol, and is configured to compare, in a back-up automotive comparison execution, a second real time temperature change and/or a second temperature of the automotive electrochemical unit detected by the automotive computer system, with a pre-set indicative temperature change and/or a pre-set temperature in the control unit.

10. The vehicle according to claim 8, wherein the automotive computer system is configured to monitor different temperatures of different electrochemical units in a battery pack of the vehicle and is configured to identify at least one temperature change and/or temperature of at least one automotive electrochemical unit deviating from at least one pre-set indicative temperature change and/or temperature of the automotive electrochemical unit depending on a driving mode of the vehicle.

11. A data medium configured for storing a program, the program configured for controlling the automotive fire suppression system of the vehicle according to claim 8, wherein said data medium comprises a program code stored on the data medium, wherein the program code is readable on the control unit.

12. A data medium product comprising a program code stored on a data medium according to claim 11, wherein the program code is readable on the control unit for when the data medium is run on the control unit.

13. A method of reducing heat output of an automotive electrochemical unit by an automotive fire suppression system of a vehicle, the automotive fire suppression system comprising:

a fire extinguishing fluid container adapted to be arranged remote and/or adjacent to and/or in contact with the automotive electrochemical unit, the fire extinguishing fluid container adapted to hold a fire extinguishing fluid for reducing the heat output of the automotive electrochemical unit, the fire extinguishing fluid being a liquid; and a secondary fire suppression system adapted to be coupled to an automotive computer system of the vehicle, the secondary fire suppression system comprising a control unit and at least one fire extinguishing fluid outlet device coupled to the fire extinguishing fluid container and configured to discharge the fire extinguishing fluid over the automotive electrochemical unit upon command from the automotive computer system of the automotive fire suppression system and/or from the control unit of the secondary fire suppression system, the method comprising the steps of:

arranging the fire extinguishing fluid container in the vehicle;

filling the fire extinguishing fluid container with the extinguishing fluid prior or after said arranging step;

coupling the automotive computer system of the automotive fire suppression system to the control unit of the secondary fire suppression system via a communication protocol;

comparing, in an automotive comparison execution, a real time temperature change and/or temperature of the automotive electrochemical unit detected by the automotive fire suppression system, with an indicative temperature change and/or indicative temperature of the automotive electrochemical unit; and comparing, in a first comparison execution, at least one gas character, generated by the automotive electrochemical unit and detected by the secondary fire suppression system, with at least one indicative gas character pre-set in the control unit of the secondary fire suppression system; and commanding discharge of the fire extinguishing fluid, if either of the automotive comparison execution or the first comparison execution or both comparison executions implies that an indicative limit is exceeded.

14. The method according to claim 13, further comprising the steps of:

signaling the real time temperature change and/or temperature of the automotive electrochemical unit detected by the automotive computer system to the control unit of the secondary fire suppression system; wherein the control unit commands discharge of the fire extinguishing fluid.

15. An automotive fire suppression system for a vehicle configured to reduce heat output of an automotive electrochemical unit of the vehicle, the automotive fire suppression system comprising:

a fire extinguishing fluid container adapted to be arranged remote and/or adjacent to and/or in contact with the automotive electrochemical unit, the fire extinguishing fluid container adapted to hold a fire extinguishing fluid for reducing the heat output of the automotive electrochemical unit, the fire extinguishing fluid being a liquid; and a secondary fire suppression system adapted to be coupled to an automotive computer system of the vehicle, the secondary fire suppression system comprising:

a control unit adapted to couple to the automotive computer system via a communication protocol; and at least one fire extinguishing fluid outlet device coupled to the fire extinguishing fluid container and configured to discharge the fire extinguishing fluid over the automotive electrochemical unit upon command from the automotive computer system and/or command from the control unit of the secondary fire suppression system, wherein the control unit is configured to compare, in an automotive comparison execution, a real time temperature change and/or temperature of the automotive electrochemical unit detected by the automotive fire suppression system, with an indicative temperature change and/or indicative temperature of the automotive electrochemical unit;

compare, in a first comparison execution, at least one gas character, generated by the automotive electrochemical unit and detected by the secondary fire suppression system, with at least one indicative gas character preset in the control unit of the secondary fire suppression system; and command discharge of the fire extinguishing fluid, if either of the automotive comparison execution or the first comparison execution or both comparison executions implies that an indicative limit is exceeded.

16. A vehicle, comprising:

the automotive fire suppression system according to claim 15; and the automotive computer system.

17. A data medium configured for storing a program, the program configured for controlling the automotive fire suppression system of the vehicle according to claim 16, wherein said data medium comprises a program code stored on the data medium, wherein the program code is readable by the automotive computer system.

18. A data medium product comprising a program code stored on a data medium according to claim 17, wherein the program code is readable by the automotive computer system when the data medium is run by the automotive computer system.

* * * * *